(12) United States Patent
Sudo et al.

(10) Patent No.: US 9,122,317 B2
(45) Date of Patent: Sep. 1, 2015

(54) ELECTRONIC DEVICE AND SCREEN DISPLAY METHOD

(75) Inventors: Tomohiro Sudo, Yokohama (JP); Atsuo Chiba, Yokohama (JP); Nayu Nomachi, Yokohama (JP); Hideko Murakami, Yokohama (JP); Hiroaki Miura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 467 days.

(21) Appl. No.: 13/389,126

(22) PCT Filed: Aug. 6, 2010

(86) PCT No.: PCT/JP2010/063422
§ 371 (c)(1),
(2), (4) Date: Feb. 6, 2012

(87) PCT Pub. No.: WO2011/016564
PCT Pub. Date: Feb. 10, 2011

(65) Prior Publication Data
US 2012/0133844 A1    May 31, 2012

(30) Foreign Application Priority Data

Aug. 6, 2009 (JP) ................... 2009-183301
Oct. 28, 2009 (JP) ................... 2009-247442
Nov. 25, 2009 (JP) ................... 2009-267347

(51) Int. Cl.
*G06F 3/023* (2006.01)
*G06F 3/01* (2006.01)
(Continued)

(52) U.S. Cl.
CPC .............. *G06F 3/0233* (2013.01); *G06F 3/018* (2013.01); *G06F 3/0488* (2013.01);
(Continued)

(58) Field of Classification Search
CPC .................. H04M 2250/00; H04M 2250/70; H04M 2250/16; H04M 1/72552; H04M 2250/22; G06F 3/01; G06F 3/018; G06F 3/02; G06F 3/0233; G06F 1/1649; G06F 1/1692; G06F 3/1438; H04N 21/4316; H04N 5/45; H04N 5/44591; H04N 21/4858; G09G 2340/0407; G09G 2340/0442; G09G 2360/02; G09G 5/14
USPC .............. 455/550.1, 557, 566; 725/40, 57, 58, 725/62; 345/168, 169; 348/14.01, 14.03, 348/14.05
See application file for complete search history.

(56) References Cited

U.S. PATENT DOCUMENTS 7,861,273 B2 * 12/2010 Fries et al. ........................ 725/80
8,443,397 B2    5/2013 Hiraoka
(Continued)

FOREIGN PATENT DOCUMENTS

JP    2001243151 A    9/2001
JP    2002199244 A    7/2002
(Continued)

OTHER PUBLICATIONS

Office Action mailed Dec. 17, 2013, corresponds to Japanese patent application No. 2009-183301, for which an explanation of relevance is attached.
(Continued)

*Primary Examiner* — Nizar Sivji
(74) *Attorney, Agent, or Firm* — Lowe Hauptman & Ham, LLP

(57) ABSTRACT

According to an aspect, an electronic device includes a display unit, an operation unit, and a control unit. The display unit displays a screen corresponding to an application during execution thereof. The operation unit is operated in order to input a character. When an operation for a character input is performed through the operation unit while the screen corresponding to the application is displayed on the display unit, the control unit displays an input character on the display unit while maintaining a state in which the screen corresponding to the application before the character is input is displayed.

6 Claims, 23 Drawing Sheets

(51) Int. Cl.
*G06F 3/0488* (2013.01)
*H04N 5/45* (2011.01)
*H04N 21/485* (2011.01)
*H04N 5/445* (2011.01)
*H04M 1/725* (2006.01)

(52) U.S. Cl.
CPC ...... *H04M 1/72519* (2013.01); *H04M 1/72552* (2013.01); *H04M 2250/22* (2013.01); *H04M 2250/70* (2013.01); *H04N 5/44591* (2013.01); *H04N 5/45* (2013.01); *H04N 21/4858* (2013.01)

(56) References Cited

U.S. PATENT DOCUMENTS

| | | | |
|---|---|---|---|
| 2002/0089518 A1* | 7/2002 | Shigeta | 345/629 |
| 2006/0099938 A1 | 5/2006 | Lee | |
| 2006/0265726 A1* | 11/2006 | Byun et al. | 725/40 |
| 2008/0096611 A1 | 4/2008 | Lee | |
| 2008/0157998 A1 | 7/2008 | Zuo et al. | |
| 2009/0058816 A1 | 3/2009 | Takeuchi | |
| 2009/0125839 A1* | 5/2009 | Kano et al. | 715/788 |
| 2010/0058229 A1* | 3/2010 | Mercer | 715/788 |
| 2010/0262924 A1* | 10/2010 | Kalu | 715/753 |
| 2010/0295791 A1 | 11/2010 | Nishimura et al. | |
| 2012/0169774 A1* | 7/2012 | Yu | 345/661 |

FOREIGN PATENT DOCUMENTS

| | | |
|---|---|---|
| JP | 2004336179 A | 11/2004 |
| JP | 2005130133 A | 5/2005 |
| JP | 200613967 A | 1/2006 |
| JP | 2006141019 A | 6/2006 |
| JP | 2006303562 A | 11/2006 |
| JP | 2006325216 A | 11/2006 |
| JP | 2007201529 A | 8/2007 |
| JP | 2008166980 A | 7/2008 |
| JP | 2009059264 A | 3/2009 |
| JP | 2009130899 A | 6/2009 |
| JP | 2009176118 A | 8/2009 |
| WO | 2008084696 A1 | 7/2008 |
| WO | 2009009359 A1 | 7/2009 |

OTHER PUBLICATIONS

Office Action mailed Jun. 25, 2013 corresponds to Japanese patent application No. 2009-183301.
Office Action mailed Jun. 25, 2013 corresponds to Japanese patent application No. 2009-247442.
Office Action mailed Jun. 25, 2013 corresponds to Japanese patent application No. 2009-267347.
International Search Report and Written Opinion for PCT/JP2010/063422 dated Oct. 26, 2010.
Office Action mailed Dec. 10, 2013, corresponds to Japanese patent application No. 2009-267347, for which an explanation of relevance is attached.
Operational Manual for au by KDDI A5523T.

* cited by examiner

ELECTRONIC DEVICE AND SCREEN DISPLAY METHOD

CROSS-REFERENCE TO RELATED APPLICATION

This application is a National Stage of PCT international application Ser. No. PCT/JP2010/063422 filed on Aug. 6, 2010 which designates the United States, and which is based upon and claims the benefit of priority from Japanese Patent Application No. 2009-183301, filed on Aug. 6, 2009, Japanese Patent Application No. 2009-247442, filed on Oct. 28, 2009, and Japanese Patent Application No. 2009-267347, filed on Nov. 25, 2009.

FIELD

The present invention relates to an electronic device and a screen display method for inputting a character based on an operation by an operator.

BACKGROUND

Electronic devices (character input devices) include those provided with an input unit for inputting a character string and a display unit for displaying a conversion candidate of the input character string. Patent Literature 1 describes a system in which a character input is performed by pressing a button of a remote controller for operating a television receiver.

Some electronic devices (mobile electronic devices) are provided with a display unit for displaying various pieces of information and an operation unit for inputting a character string. In a mobile phone as an example of the mobile electronic device, a browser system is used to display a Web page on the display unit, so that a user can browse desired WEB pages (see Patent Literature 2).

Electronic devices include a mobile phone capable of executing various applications (for example, WEB browser). In such electronic devices, a screen corresponding to an activated application is displayed on a display unit (see Patent Literature 3).

Some electronic devices have an operation unit (specifically, operation keys), and a user operates the operation keys, so that activation of an application, a character input at the time of composing mail, and the like are executed.

CITATION LIST

Patent Literature

Patent Literature 1: Japanese Patent Application Laid-open No. 2002-199244
Patent Literature 2: Japanese Patent Application Laid-open No. 2001-243151
Patent Literature 3: Japanese Patent Application Laid-open No. 2006-303562

Technical Problem

Even when a user is viewing a TV program, it is sometimes necessary to input characters in order to make a note of contents of the TV program, search for a Kanji character, and a like. However, the system described in Patent Literature 1 requires mode switching by pressing a mail button, which causes complicated operation.

Conventionally, even in the middle of browsing a WEB page, it is sometimes necessary to input characters such as making a note of information on the WEB page. However, in Patent Literature 2, such a case requires to input characters by quitting the browser for browsing the WEB page and thereafter activating an application capable of a character input such as a notepad application, which causes complicated operation.

During display of a screen corresponding to the application, the key operation not related to the display of the screen is restricted. For example, during the display of the screen by a WEB browser, even if a number is input, it is not displayed on the screen. Therefore, when characters are desired to be input, it is necessary to interrupt the application during execution thereof (as a result, the displayed screen disappears) and activate a character input application.

For the foregoing reasons, there is a need for an electronic device and a screen display method that allow the operator to perform a character input by an easy operation even during reception of a TV broadcast.

For the foregoing reasons, there is a need for an electronic device and a screen display method that allow the operator to perform a character input easily even during browsing of a WEB page.

For the foregoing reasons, there is a need for an electronic device and a screen display method that allow the operator to perform a character input while displaying a screen corresponding to an application during execution thereof.

SUMMARY

According to an aspect, an electronic device includes: a display unit for displaying a screen corresponding to an executable application during execution thereof; an operation unit that is operated in order to input a character; and a control unit for displaying, when an operation for a character input is performed through the operation unit while the screen corresponding to the executable application is displayed on the display unit, an input character on the display unit while maintaining a state in which the screen corresponding to the execution application before the character is input is displayed.

According to another aspect, the display unit includes a first display unit and a second display unit, and the control unit displays, when the operation for the character input is performed through the operation unit while the screen corresponding to the executable application is displayed on the first display unit, the input character on the second display unit while maintaining a state in which the screen corresponding to the executable application before the character is input is displayed on the first display unit.

According to another aspect, the electronic device further includes a communication unit for making an outgoing call to the other party, the operation unit includes a call key for making an outgoing call to the other party, and the control unit makes, when a number string forming a phone number is displayed on the second display unit as the input character, an outgoing call to the other party with the phone number corresponding to the number string in response to the operation of the call key.

According to another aspect, the control unit displays information for the outgoing call together with the screen corresponding to the executable application on the first display unit when making the outgoing call to the other party with the phone number corresponding to the number string displayed on the second display unit.

According to another aspect, the control unit displays the screen corresponding to the executable application on the first display unit even after the outgoing call is made to the other party with the phone number corresponding to the number string.

According to another aspect, the control unit controls so as to suppress display of the second display unit until an operation for the character input through the operation unit is performed while the screen corresponding to the executable application is displayed on the first display unit.

According to another aspect, the electronic device further includes: a first housing that is provided with the first display unit; and a second housing that is provided with the operation unit and the second display unit whose display area is smaller than the first display unit, and is movable to the first housing.

According to another aspect, the control unit displays, when the operation for the character input is performed through the operation unit while the screen corresponding to the executable application is displayed on the display unit, the input character together with the screen corresponding to the executable application on the display unit while maintaining a display size of the screen corresponding to the executable application displayed on the display unit.

According to another aspect, the display unit displays, when TV broadcast including a plurality of channels is reproduced, a picture of the TV broadcast as the screen corresponding to the executable application, the operation unit is assigned with a channel input operation for changing the channel and with a character input operation for characters, and the control unit further includes an input detector for detecting an input through the operation unit, determines, when the picture of the TV broadcast being the screen corresponding to the executable application is displayed on the display unit, whether an input detected by the input detector is the character input operation or the channel input operation, and performs the character input, when it is determined that the input is the character input operation, based on the detection of the input detector.

According to another aspect, the operation unit includes a plurality of operation keys to each of which the channel and the character are assigned, and the input detector detects pressing of the operation key as the input through the operation unit.

According to another aspect, the control unit suspends a change of the channel when the operation unit is performed while the picture of the TV broadcast is displayed, and performs a character input through the operation unit with the display of the picture of the TV broadcast continued when the operation unit is further operated before elapse of a predetermined time since the suspension.

According to another aspect, the input detector is a touch panel for detecting a touch on the display unit, and detects the touch on the touch panel as the input through the operation unit.

According to another aspect, the control unit displays, when a character input is performed based on the detection of the input detector, an input screen for the character input together with the picture of the TV broadcast of a channel to be reproduced right before the character input is started, on the display unit.

According to another aspect, the control unit reads character information extracted from the picture of the TV broadcast during reproduction, and inputs the read character information into an input screen for the character input.

According to another aspect, the display unit displays Web page information acquired through a communication network as the screen corresponding to the executable application, and the control unit displays, when an operation is performed through the operation unit while the Web page information is displayed on the display unit as the screen corresponding to the executable application, an input-character display area for inputting a character through the operation unit on the display unit while maintaining a state in which at least part of the Web page information is displayed on the display unit, and transmits, when an instruction for a text application capable of a character input is issued while the character is input in the input-character display area, the character in the input-character display area to the text application.

According to another aspect, the text application has a character input area for inputting a character, and the control unit inputs, when the text application is activated by the instruction for the text application while the character is input in the input-character display area, the character in the input-character display area into the character input area that the text application has.

According to another aspect, the control unit determines, when the operation is performed through the operation unit while the Web page information is displayed on the display unit, whether the operation is an operation for the Web page information or an operation for the character input, and displays the input-character display area for inputting a character on the display unit when it is determined that the operation is for the character input.

According to another aspect, the control unit causes character information extracted from the Web page information displayed on the display unit to be input into the input-character display area.

According to another aspect, the operation unit includes a plurality of keys arranged in different positions, the display unit is divided into a plurality of display areas corresponding to the positions where the plurality of keys are arranged, and the control unit causes, when the operation is performed through the operation unit while a WEB page is displayed on the display unit, character information extracted from the display area of the display unit corresponding to the position where the operated key is arranged to be input into the input-character display area.

According to another aspect, a screen display method of an electronic device that can display an input character includes, by a control unit of the electronic device, activating an executable application; displaying a screen corresponding to the activated executable application on a display unit; and displaying, when a character is input while the screen corresponding to the executable application is displayed on the display unit, the input character on the display unit while maintaining a state in which the screen corresponding to the executable application before the character is input is displayed.

Advantageous Effects of Invention

According to one aspect of the present invention, there are advantageous effects that characters can be input and displayed by an easy operation even during execution of various applications and therefore operability can be improved.

DESCRIPTION OF EMBODIMENTS

The present invention will be explained in detail below with reference to the drawings. It should be noted that the present invention is not limited by the following explanation. In addition, the components in the explanation below include those which are easily thought of by persons skilled in the art, those which are substantially equivalents, and those in a scope of so-called equivalents. In the following, as a mobile electronic device being one example of the electronic device (or the character input device), a mobile phone is used as an example to be explained, however, a target to which the present invention is applied is not limited to the mobile phone. The present invention is also applicable to, for example, PHSs (Personal Handy-phone Systems: registered trademark), PDAs (Personal Digital Assistants), personal computers, portable navigation devices, and gaming devices. In embodiments explained below, the present invention can also be used for cases, as broadcast waves, such as one-segment portion reception service for mobile phones and mobile terminals, 12 segments of digital terrestrial broadcasting, analog broadcasting, and digital radio broadcasting.

Figure 1:
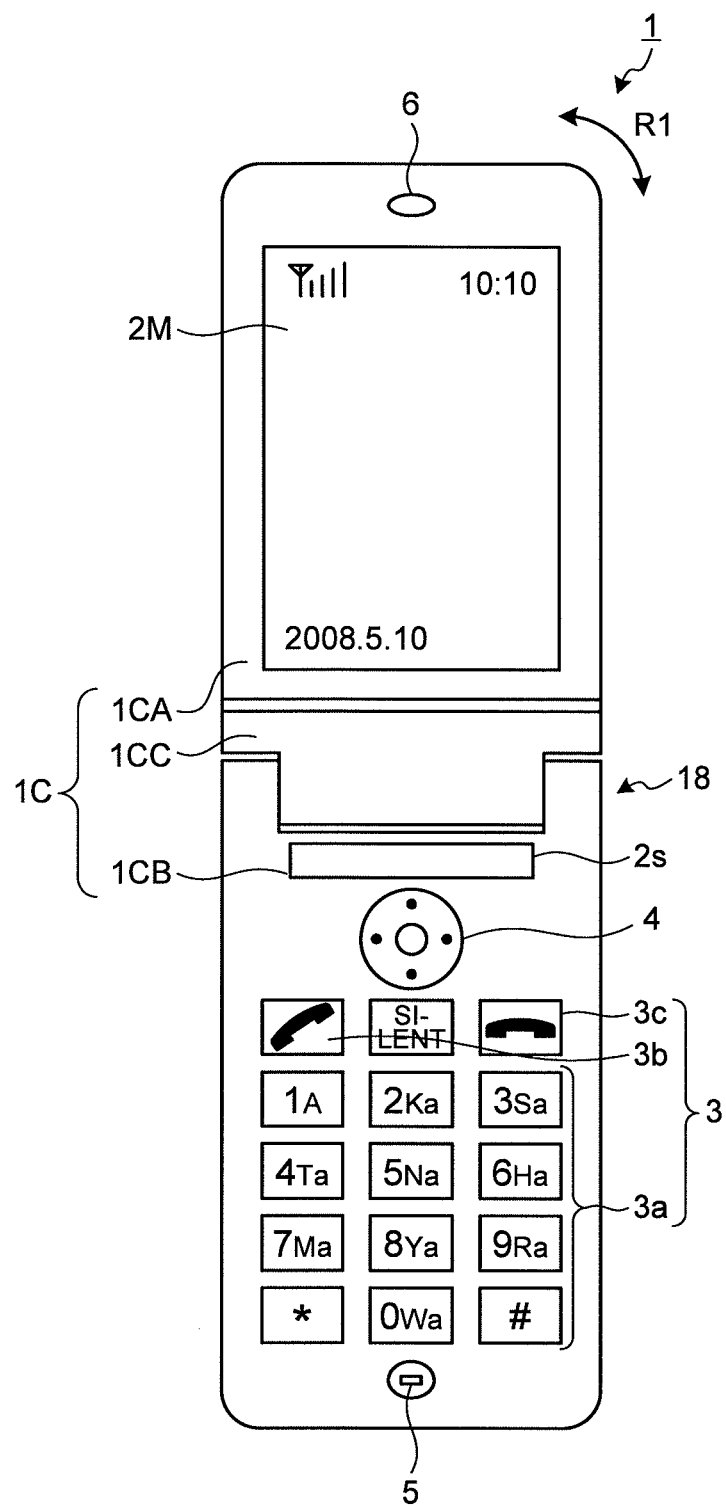
FIG. 1 is a front view illustrating a schematic configuration of one embodiment of a mobile electronic device being one example of an electronic device according to the present invention.
Figure 2:
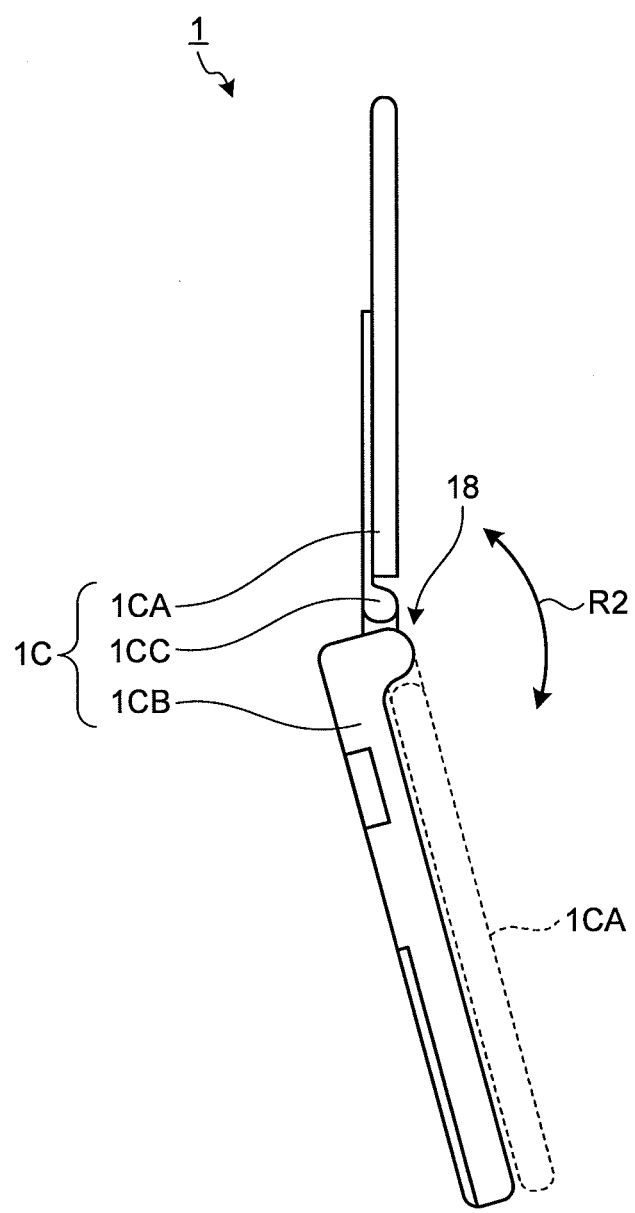
FIG. 2 is a side view of the mobile electronic device in FIG. 1.

FIG. 1 is a front view illustrating a schematic configuration of one embodiment of the mobile electronic device being one example of the character input device according to the present invention. FIG. 2 is a side view of the mobile electronic device in FIG. 1. The configuration of the mobile electronic device will be explained first. A mobile electronic device 1 is a mobile phone provided with a wireless communication function. The mobile electronic device 1 is a cycloid-type mobile phone in which a housing 1C is formed with a first housing 1CA, a second housing 1CB, and a third housing 1CC in such a manner as to be openable/closable and rotatable. FIG. 1 and FIG. 2 represent a state where the mobile electronic device 1 is opened and is not rotated. In the present embodiment, the housing is a cycloid type, however, the shape of the housing is not particularly limited to any shape, and therefore the housing can be formed to various types of shape such as a folding type, a slide type, and a straight type.

The first housing (display-unit-side housing) 1CA is provided with a main display 2M illustrated in FIG. 1 as a display unit. The main display 2M displays a standby image when the mobile electronic device 1 awaits reception, and displays a menu image used to assist the operations of the mobile electronic device 1. As illustrated in FIG. 1, the first housing 1CA is also provided with a receiver 6 that outputs voice during a phone call using the mobile electronic device 1.

The second housing (operation-unit-side housing) 1CB is provided with a plurality of operation keys 3 such as a numeric keypad 3a, a call key 3b, and a call-end key 3c used to input a phone number of the other party on the phone and characters when mail is composed, and is also provided with a direction and decision key 4 so as to easily perform selection and decision of a menu displayed on the main display 2M, scrolling of a screen, and so on. The operation keys 3 and the direction and decision key 4 form an operation unit 28 (see FIG. 3) of the mobile electronic device 1. Provided in the second housing 1CB is a sub-display 2S whose image display area is smaller than that of the main display 2M. Provided also in the second housing 1CB is a microphone 5 for receiving voice during a phone call using the mobile electronic device 1.

The first housing 1CA and the second housing 1CB are coupled to each other by the third housing 1CC. The third housing 1CC is connected to the second housing 1CB in an openable/closable manner and is connected to the first housing 1CA in a rotatable manner. Specifically, the first housing 1CA is supported by the third housing 1CC so as to relatively rotate around an axis orthogonal to the main display 2M as a rotation axis. The second housing 1CB and the third housing 1CC are connected to each other by a hinge 18. Thus, the first housing 1CA and the second housing 1CB (and the third housing 1CC) are rotated around the axis (direction indicated by arrow R1 in FIG. 1) orthogonal to the main display 2M about a connection between the first housing 1CA and the third housing 1CC. In addition, the first housing 1CA (and the third housing 1CC) and the second housing 1CB are configured so that both of them can be rotated about the connection (that is, the hinge 18) between the second housing 1CB and the third housing 1CC and be rotated in mutually separating directions and in mutually approaching directions (directions indicated by arrow R2 in FIG. 2). When the first housing 1CA and the second housing 1CB are rotated in the mutually separating directions, the mobile electronic device 1 opens, and when first housing 1CA and the second housing 1CB are rotated in the mutually approaching directions, the mobile electronic device 1 closes.

Figure 3:
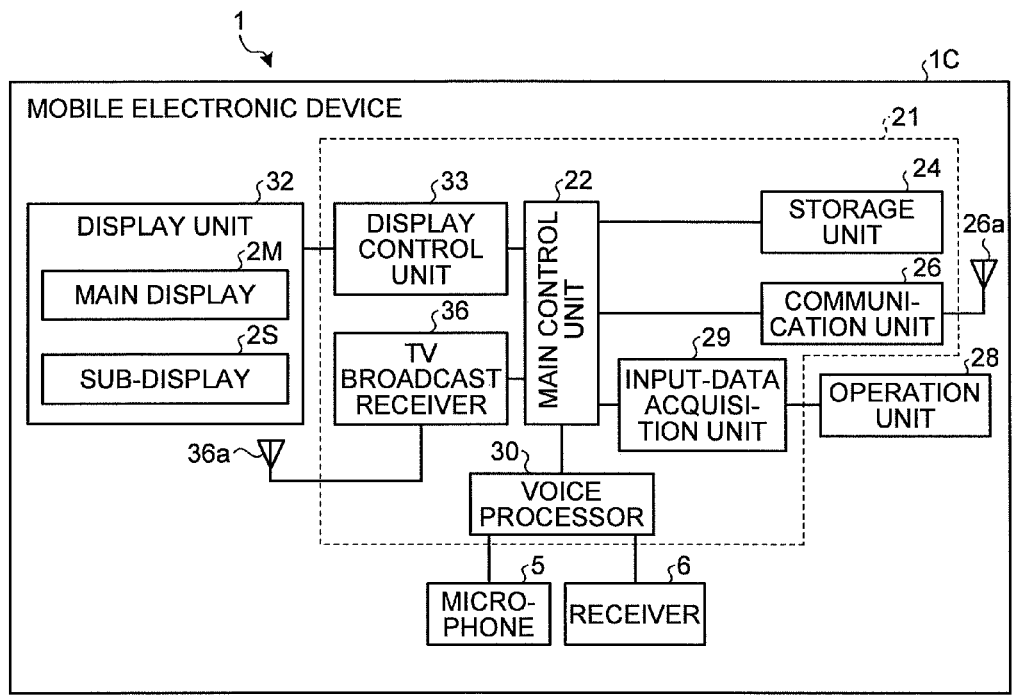
FIG. 3 is a block diagram illustrating a schematic configuration of functions of the mobile electronic device in FIG. 1.

Next, a relation between functions and a control unit of the mobile electronic device 1 will be explained below. FIG. 3 is a block diagram illustrating a schematic configuration of functions of the mobile electronic device in FIG. 1. As illustrated in FIG. 3, the mobile electronic device 1 includes a main control unit 22, a storage unit 24, a communication unit 26, an operation unit 28, an input-data acquisition unit 29, a voice processor 30, a display unit 32, a display control unit 33, and a TV broadcast receiver 36. The main control unit 22, the storage unit 24, the communication unit 26, the input-data acquisition unit 29, the voice processor 30, the display control unit 33, and the TV broadcast receiver 36 are incorporated in a controller (control circuit) 21 provided inside the housing 1C.

The main control unit 22 is a processor, e.g., a CPU (Central Processing Unit), that integrally controls the entire operation of the mobile electronic device 1. That is, the main control unit 22 controls the operations of the communication unit 26, the display unit 32, the TV broadcast receiver 36, and the like so as to execute various processes of the mobile electronic device 1 in an appropriate procedure according to the operation of the operation unit 28 and software stored in the storage unit 24 of the mobile electronic device 1. The main control unit 22 executes the processes based on programs (for example, operating system programs and application programs) stored in the storage unit 24. The storage unit 24 stores therein software and data used for the processes performed by the main control unit 22. Specifically, the storage unit 24 stores therein software for reproducing a TV broadcast based on data received by the TV broadcast receiver 36, software for performing a character input process, software for transmitting/receiving mail, dictionary data used to extract a candidate for conversion upon character conversion, and so on.

The communication unit 26 includes an antenna 26a, and establishes a wireless signal path using CDMA system or so with a base station via a channel assigned by the base station, and performs telephone communication and information communication with the base station.

The operation unit 28 is formed with the operation keys 3 (the numeric keypad 3a, the call key 3b, and the call-end key 3c) such as a power key, a call key, numeric keys, character keys, direction keys, a decision key, and a send key to which various functions are assigned respectively, and the direction and decision key 4. The numeric keypad 3a is assigned with characters, and a character input is performed by pressing the numeric keypad 3a. When these keys are input through the user's operation, the operation unit 28 generates a signal corresponding to the contents of the operation. The generated signal is input to the input-data acquisition unit 29 as an instruction from the user.

The input-data acquisition unit 29 generates a control signal based on the generated signal sent from the operation unit 28 and input settings, and inputs the generated control signal to the main control unit 22. For example, in a case of the character input, the input-data acquisition unit 29 extracts one character from among characters assigned to each of the keys based on the number of operation times of each of the keys in the operation keys 3, and outputs the character as character information to the main control unit 22. In the present embodiment, the operation keys 3 are formed with 15 keys, and 10 keys (numeric keypad 3a) out of the 15 keys are assigned with numbers so as to input 1 to 9 and 0 thereto respectively in a mode to input the numbers. Moreover, in a mode to input characters, the keys (numeric keypad 3a) assigned with the numbers 1 to 9 are assigned with characters so as to input characters from an "A" row to a "Ra" row (in Japanese "A" row, "Ka" row, "Sa" row, "Ta" row, "Na" row, "Ha" row, "Ma" row, "Ya" row, and "Ra" row, each of which contains five characters including one of vowels of "a", "i", "u", "e", and "o", are used) thereto respectively and the key assigned with the number of 0 is assigned with "Wa", "Wo", and "N" so as to be input thereto. Contracted sounds of each of the rows and the numbers are also assigned to the keys having been assigned with the respective rows. A predetermined array order is set in the characters assigned to each of the keys. Specifically, an array order of "A", "I", "U", "E", "O", "a", "i", "u", "e", "o", and "1" is set in a "1A" key assigned with the "A" row and "1". Moreover, the array order is toggled. That is, the characters assigned to each of the keys are set so as to circulate in such a manner that "1" is followed by "A" and thereafter the above-explained array order is repeated. In a case of a channel operation, the input-data acquisition unit 29 detects a pressed key and outputs information for the channel (selection information of a broadcast station) corresponding to the key to the main control unit 22. That is, when "1" of the operation keys 3 is pressed, the information for the channel corresponding to "1" is sent to the main control unit 22. In addition, two of the pressing of the key a plurality of times and the information for the channel may be set in a corresponding manner.

The input-data acquisition unit 29 detects the pressing of the operation key 3 and determines a character to be displayed (selected) among the characters in the array order based on the number of pressing times. When the same operation key 3 is continuously pressed, that is, when the operation key 3 (to be exact, one of the operation keys 3) same as the previous key is pressed, the input-data acquisition unit 29 selects a character to be displayed (input candidate character) in the array order based on the number of pressing times. In addition, when different operation key 3 is pressed, that is, when the operation key 3 (to be exact, one of the operation keys 3) different from the previously pressed operation key 3 is pressed, the input-data acquisition unit 29 causes a first character in the array order of the pressed operation key 3 to be displayed.

The voice processor 30 executes processes of a voice signal input to the microphone 5 and a voice signal output from the receiver 6.

The display unit 32 is provided with a display panel (the main display 2M, etc.) formed with LCD (Liquid Crystal Display), an organic EL (Organic Electro-Luminescence) panel, OLED (Organic Light Emitting Diode), or the like, and displays a picture according to video data and an image according to image data supplied from the main control unit 22 through the display control unit 33 on the display panel.

The TV broadcast receiver (TV broadcast tuner) 36 has a TV antenna 36a for receiving digital terrestrial broadcasting including a plurality of channels, in the present embodiment, for receiving radio waves of a predetermined channel of TV broadcasts, and processes an input signal received by the TV antenna 36a and sends the processed signal to the main control unit 22. As one example, the TV broadcast receiver 36 performs signal processing such as amplification, detection, and frequency conversion on the input signal received by the TV antenna 36a using a tuning device, converts the signal to a digital signal, in the present embodiment, to MPEG-2 TS (Transport Stream), and outputs the digital signal to the main control unit 22. The output digital signal is processed by the application program driven by the main control unit 22, and the processed signal is displayed on the display of the display unit 32, and/or is stored in the storage unit 24. The sound is output from the receiver 6 or from a speaker provided apart from the receiver 6.

Figure 4:
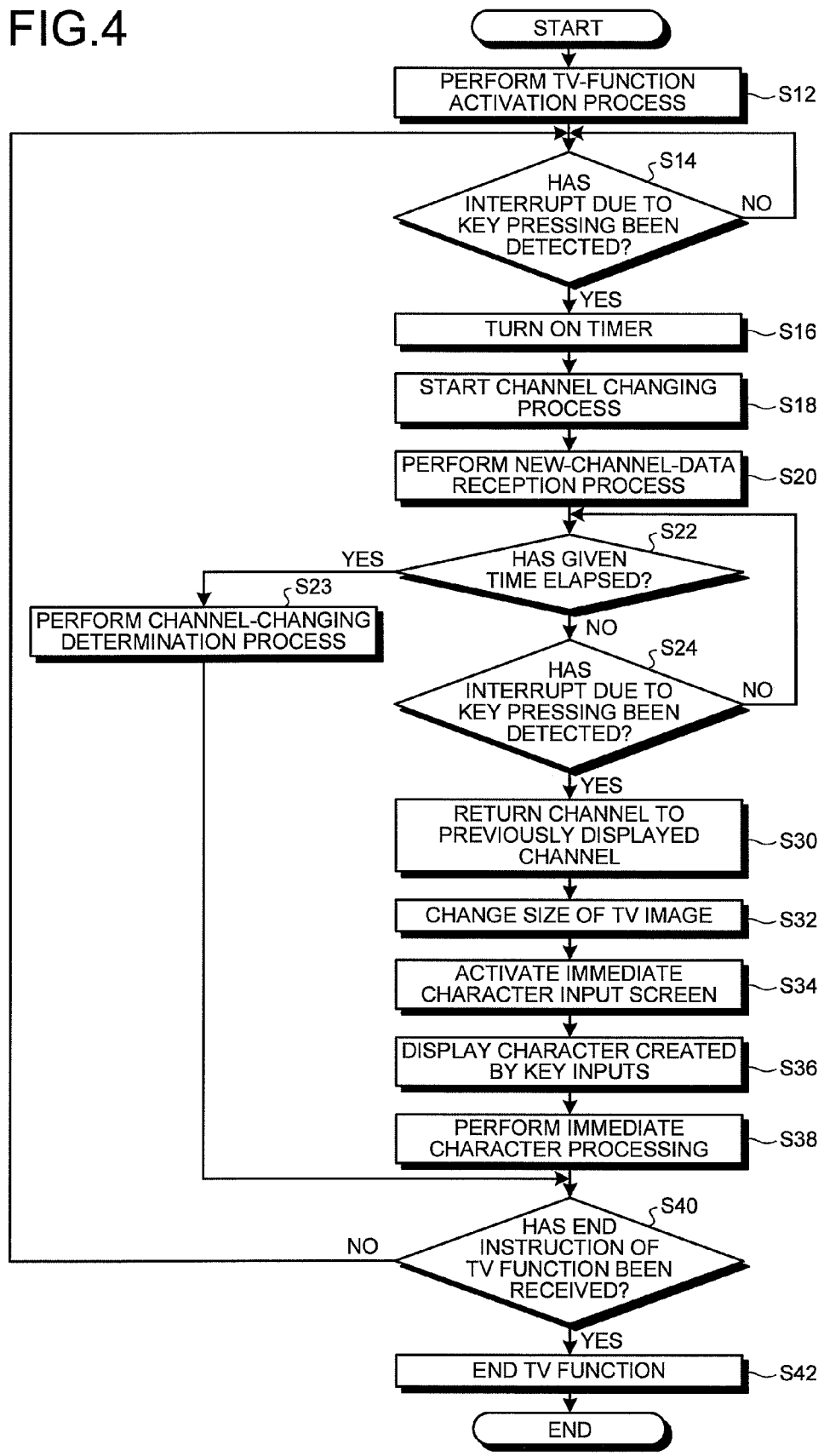
FIG. 4 is a flowchart illustrating one example of a processing operation of the mobile electronic device.

Next, the operation of the mobile electronic device 1, the input operation to the operation unit 28, and the process performed by the main control unit 22 will be explained below. FIG. 4 is a flowchart illustrating one example of a processing operation of the mobile electronic device. The flowchart illustrated in FIG. 4 represents one example of the process when an operation key is pressed during display of a TV image. In the example of FIG. 4, a single-digit number is assigned to each of channels of TV images, and by pressing one button of the operation keys 3, an instruction to change a channel can be input.

First, the mobile electronic device 1 is operated by the operator to input an instruction to activate a TV function. When the instruction to activate the TV function is input, the main control unit 22 of the mobile electronic device 1 performs a TV-function activation process, at Step S12. The TV-function activation process represents processes for reading software to provide TV broadcasts from the storage unit 24, activating the software, receiving the radio waves of the TV broadcasts by the TV broadcast receiver 36, converting the received radio waves, displaying an image on the display unit 32, and outputting sound from the receiver 6 or the speaker.

When the TV-function activation process is performed at Step S12, the main control unit 22 determines whether an interrupt due to key pressing has been detected, at Step S14. That is, the main control unit 22 determines whether the operation unit 28 has been operated by the operator.

When it is determined at Step S14 that the interrupt due to key pressing has not been detected (No), the main control unit 22 proceeds again to Step S14, and determines whether the interrupt due to key pressing has been detected. That is, the main control unit 22 repeats the process of Step S14 until the interrupt due to key pressing is detected while outputting the TV broadcast received by the TV broadcast receiver 36.

Subsequently, when it is determined at Step S14 that the interrupt due to key pressing has been detected (Yes), the main control unit 22 turns on a timer, at Step S16. When turned on, the timer measures time elapsed since the turn-on, that is, measures elapsed time since the detection of the key pressing.

When the timer is turned on at Step S16, the main control unit 22 starts a channel changing process, at Step S18. Specifically, the main control unit 22 starts the process of switching a TV broadcast to be output to a TV broadcast of a channel corresponding to the key pressed at Step S14. When the channel changing process is started at Step S18, the main control unit 22 performs a new-channel-data reception process, at Step S20. That is, the main control unit 22 starts the process for receiving the data for the TV broadcast corresponding to the channel changed at Step S18 through the TV-broadcast receiver 36 and for outputting the data.

When the reception process of the new channel data (that is, TV broadcast data of the new channel) is started at Step S20, the main control unit 22 determines whether a given time has elapsed, at Step S22. Whether the given time has elapsed is determined based on whether the elapsed time of the timer that has been turned on at Step S16 reaches the set time. When it is determined that the given time has elapsed (Yes), then the main control unit 22 performs a channel-changing determination process, at Step S23, and, thereafter, proceeds to Step S40. The channel-changing determination process is a process for determining the channel, for which data is started to be received at Step S20, as the channel of the TV broadcast to be output. With this process, the TV broadcast of the channel determined at Step S23 is output until a subsequent new channel changing process is input. The main control unit 22 ends the process of Step S23, and proceeds to Step S40.

When it is determined at Step S22 that the given time has not elapsed (No), the main control unit 22 determines whether the interrupt due to key pressing has been detected, at Step S24. That is, the main control unit 22 determines whether key pressing different from the key pressing at Step S14, that is, second key pressing has been detected.

When it is determined at Step S24 that the interrupt due to key pressing has not been detected (No), the main control unit 22 proceeds to Step S22. That is, the main control unit 22 repeats Step S22 and Step S24 until the interrupt due to key pressing is detected before the given time has elapsed.

When it is determined at Step S24 that the interrupt due to key pressing has been detected (Yes), the main control unit 22 returns the channel to a previously displayed channel, at Step S30. That is, the main control unit 22 receives the data for the TV broadcast of the channel as the channel displayed before the channel changing process is started at Step S18, and starts outputting the TV broadcast of the channel. The main control unit 22 stops the processes at Step S18 and at Step S20, and returns the channel of the TV broadcast to be output to the channel before Step S18.

When the channel is returned to the previously displayed channel at Step S30, the main control unit 22 changes the display size of the TV image, at Step S32. That is, the main control unit 22 reduces an area of the screen of the TV broadcast to be displayed on the display unit 32.

When the display size of the TV image is changed at Step S32, the main control unit 22 activates an immediate character input screen, at Step S34. The immediate character input screen is a screen where input character information is displayed, and the screen is displayed on the display unit 32 together with the screen of the TV broadcast.

When the immediate character input screen is activated at Step S34, the main control unit 22 displays a character created by the key inputs, at Step S36. Specifically, character(s) corresponding to the key operations input at Step S14 and Step S24 is displayed.

When the character is displayed at Step S36, the main control unit 22 performs immediate character processing, at Step S38. The immediate character processing is a process of displaying a character corresponding to the input key operations and further converting the input character, of which conversion operation is detected, to Kanji, Katakana, symbol, or the like. Moreover, the immediate character processing activates a schedule function, an address book function, a memo function, or the like to store the input character string in the storage unit 24 corresponding to each of functions as necessary. After the end of the immediate character processing, the main control unit 22 proceeds to Step S40.

After the completion of the process of Step S23 or Step S38, the main control unit 22 determines whether an end instruction of the TV function has been received, at Step S40. When it is determined at Step S40 that the end instruction has not been received (No), the main control unit 22 proceeds to Step S14 and repeats the operations while outputting the TV broadcast. When it is determined at Step S40 that the end instruction of the TV function has been received (Yes), the main control unit 22 ends the TV function at Step S42, and ends the process. That is, the main control unit 22 terminates the output of the TV broadcast, and ends the process.

Figure 5:
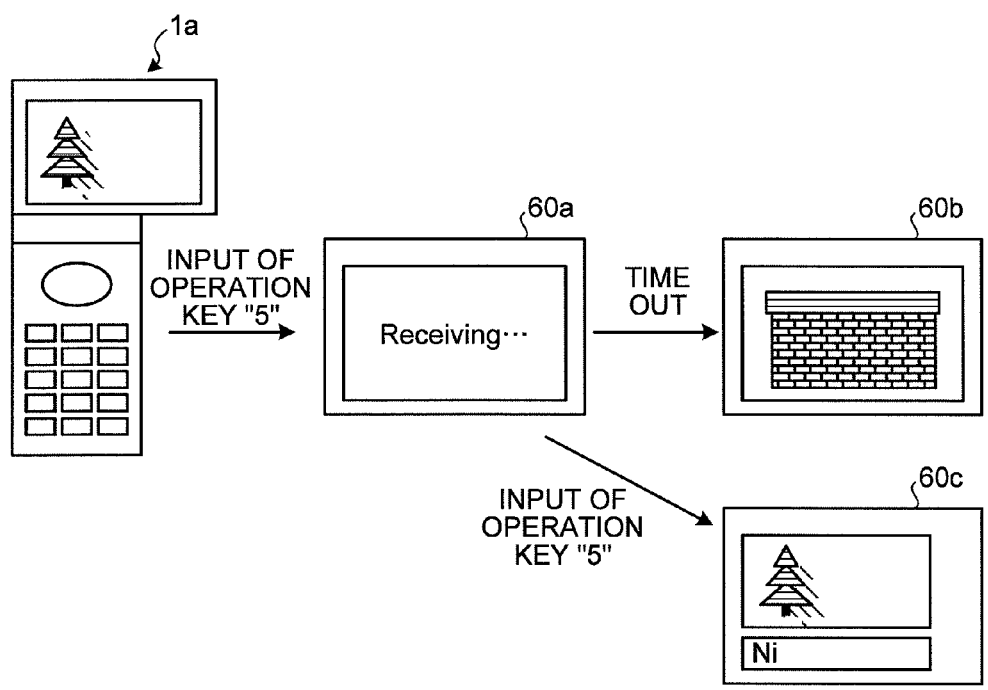
FIG. 5 is an explanatory diagram for explaining operations of the mobile electronic device.

Changes of the display unit will be explained below with reference to FIG. 5. FIG. 5 is an explanatory diagram for explaining operations of the mobile electronic device. First, when the TV function is activated at Step S12, the TV broadcast of the set channel is displayed on the display unit 32 as illustrated in a mobile electronic device 1a on the left side of FIG. 5. For example, when "5" of the operation keys 3 is pressed in this state, the key pressing is detected at Step S14, and the channel changing process is started at Step S18. When the channel changing process is started, a message of "Receiving . . . " indicating that the mobile electronic device is changing the channel and is receiving data for a TV broadcast of a different channel appears on the display unit 32, as illustrated in a screen 60a at the center of FIG. 5.

Thereafter, when the given time has elapsed while the key pressing operation is not detected, the channel-changing determination process is performed at Step S23, and the TV broadcast of the switched channel (the channel corresponding to "5" of the operation keys 3 in the example of FIG. 5) is output, as illustrated in a screen 60b on the upper right side of FIG. 5. On the other hand, when the key pressing operation is further detected during switching of the channel, that is, before the given time has elapsed, the immediate character input screen is displayed as illustrated in a screen 60c on the lower right side of FIG. 5. In the example illustrated in FIG. 5, "5" of the operation keys 3 is pressed, and therefore "5" of the operation keys 3 is pressed twice, and "Ni" corresponding to the operations is displayed on the input screen. At this time, the display of the screen of the TV broadcast (screen for outputting the TV broadcast) is reduced, and, in addition, the image of the TV broadcast of the channel before the pressing operation of the operation key 3 is displayed.

In this manner, when the key pressing is performed twice or more within the given time during activation of the TV function, it is determined as a character input operation, and the character input screen is displayed which allows character input, so that the operator can input characters by an easy operation even when viewing the TV broadcast. This enables the operator to write a memo or to check Kanji while viewing the TV broadcast. Moreover, there is no need to terminate the TV broadcast and thereafter activate the memo function, thus improving operability. Furthermore, the operator can easily make a note of the contents of the TV broadcast. In addition, because a character input function is activated by determining that the operation is the character input operation based on the key pressing operation, there is no need to perform particular input operation and there is also no need to assign a part of the operation keys to the activation. This does not require the operator to memorize specific operations and can simplify the configuration of the operation keys.

It is discriminated, based on the number of times of key pressing operations, whether the operation is a change of the channel or a character input, and therefore both of the operations can be performed using one operation key. In the present embodiment, if two key pressings are detected within the given time, then it is determined that the operation is the character input. However, the number of times as criteria may be set according to the maximum number of inputs of the channel operation. For example, when a double-digit number is assigned to the channel of the TV broadcast, the character input should be determined in a case of three or more key pressings within the given time, while the channel operation should be determined in a case of two or less key pressings within the given time.

Figure 6:
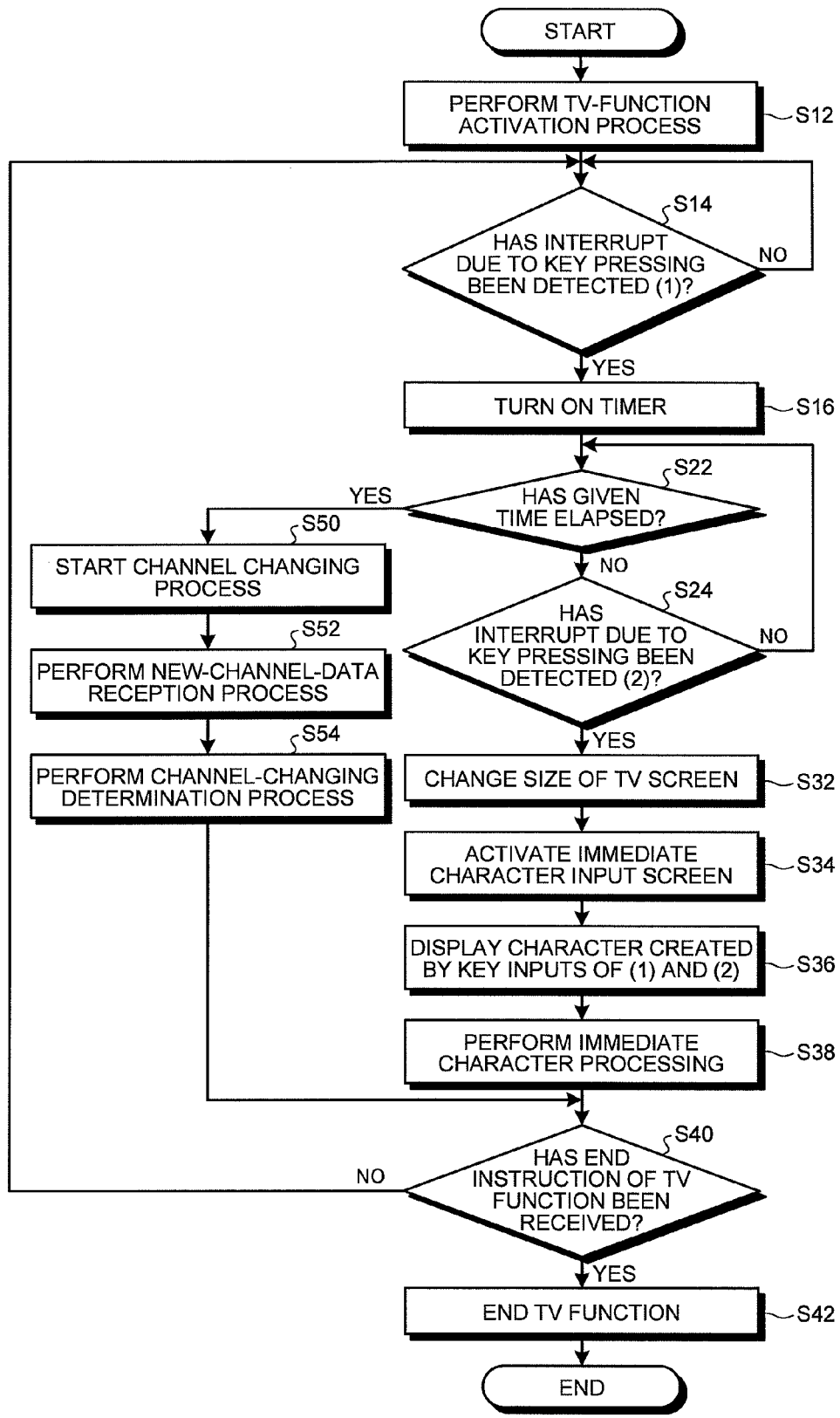
FIG. 6 is a flowchart illustrating another example of the processing operation of the mobile electronic device.

In the embodiment, the channel changing process is started at the time of detecting the key pressing operation at Step S14, however, the operation is not limited thereto. Therefore, after a given time has elapsed without detection of key pressing since the detection of first (predetermined number of times) key pressing, the channel changing process may be started. This process will be explained below with reference to FIG. 6. FIG. 6 is a flowchart illustrating another example of the processing operation of the mobile electronic device. The flowchart of FIG. 6 includes steps for performing the same processes as these in the flowchart of FIG. 4. Therefore, the same step numbers are assigned to the steps for performing the same processes as the steps of FIG. 4, and detailed explanation is omitted. Processes specific to the flowchart of FIG. 6 will be mainly explained below.

First, the mobile electronic device 1 is operated by the operator to input an instruction to activate the TV function. When the instruction to activate the TV function is input, the main control unit 22 of the mobile electronic device 1 performs the TV-function activation process, at Step S12. When the TV-function activation process is performed at Step S12, the main control unit 22 determines whether an interrupt due to key pressing has been detected, at Step S14. When it is determined at Step S14 that the interrupt due to key pressing has not been detected (No), the main control unit 22 again proceeds to Step S14, and determines whether the interrupt due to key pressing has been detected.

Subsequently, when it is determined at Step S14 that the interrupt due to key pressing has been detected (Yes), the main control unit 22 turns on the timer, at Step S16. When the timer is turned on at Step S16, the main control unit 22 determines whether the given time has elapsed, at Step S22.

When it is determined that the given time has elapsed (Yes), the main control unit 22 starts the channel changing process, at Step S50. Specifically, the main control unit 22 starts the process of switching the TV broadcast to be output to a TV broadcast of a channel corresponding to the key pressed at Step S14. When the channel changing process is started at Step S50, the main control unit 22 performs a new-channel-data reception process, at Step S52. That is, the main control unit 22 starts the process for receiving the data for the TV broadcast corresponding to the channel changed at Step S50 through the TV broadcast receiver 36 and for outputting the data.

When the reception process of the data for the new channel (that is, the TV broadcast data for the new channel) is started at Step S52, the main control unit 22 performs the channel-changing determination process, at Step S54, and, thereafter, proceeds to Step S40. The channel-changing determination process is a process for determining the channel, for which data is started to be received at Step S52, as the channel of the TV broadcast to be output. With this process, the TV broadcast of the channel determined at Step S54 is output until a subsequent new channel changing process is input.

When it is determined at Step S22 that the given time has not elapsed (No), the main control unit 22 determines whether the interrupt due to key pressing has been detected, at Step S24. When it is determined at Step S24 that the interrupt due to key pressing has not been detected (No), the main control unit 22 proceeds to Step S22.

When it is determined at Step S24 that the interrupt due to key pressing has been detected (Yes), the main control unit 22 changes the display size of the TV image, at Step S32. That is, the main control unit 22 reduces the area of the screen of the TV broadcast displayed on the display unit 32. The processes from Step S32 to the end thereof are the same as these in the flowchart of FIG. 4, and therefore explanation thereof is omitted.

As illustrated in the flowchart of FIG. 6, by starting the channel changing process after the channel changing operation is definitely determined, there is no need to return the screen to the previous channel in the case of the character input operation (immediate character processing). That is, there is no need to perform the process of Step S30 in the flowchart of FIG. 4. Moreover, in the case of the character input operation, it is possible to reduce the time during which the screen of the TV program of the channel is disconnected. The time from the key pressing at Step S14 to actual switching of the channel becomes longer than that in the flowchart of FIG. 4.

Figure 7:
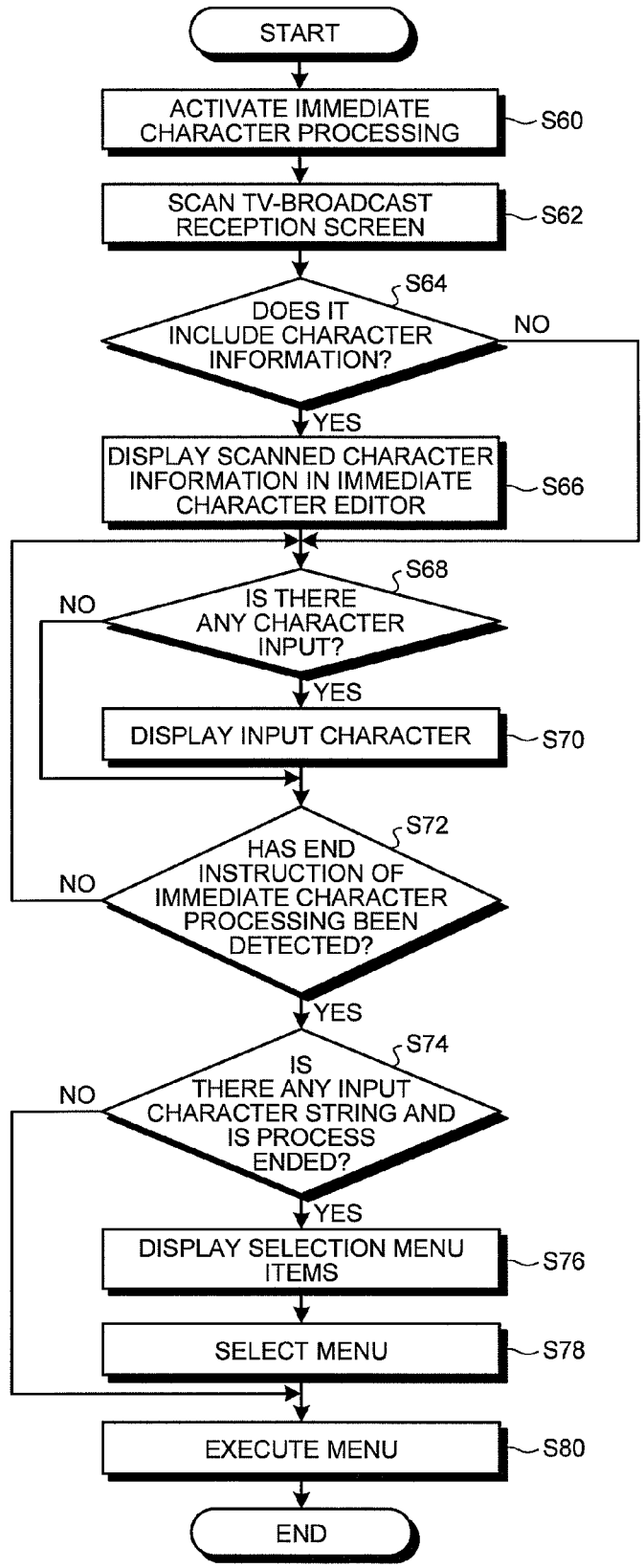
FIG. 7 is a flowchart illustrating another example of the processing operation of the mobile electronic device.

In the embodiment, the immediate character processing is assumed to input a character, however, in addition to this, information for a TV program may be captured as text. This process will be explained below with reference to FIG. 7 to FIG. 9. FIG. 7 is a flowchart illustrating another example of the processing operation of the mobile electronic device.

First, the main control unit 22 activates the immediate character processing, at Step S60. The activation of the immediate character processing is the same as the process of Step S38 in FIG. 4 and FIG. 6. After the activation of the immediate character processing at Step S60, the main control unit 22 scans a TV-broadcast reception screen, at Step S62. That is, the main control unit 22 receives and analyzes an image of the TV broadcast displayed on the screen, and acquires information for the image. Various types of image analysis software can be used for the scan (analysis). As the image analysis software, image analysis software capable of extracting at least character information included in the image is used.

After the scan of the image at Step S62, the main control unit 22 determines whether the scanned image includes the character information, at Step S64. When it is determined at Step S64 that the character information is not includes therein (No), the main control unit 22 proceeds to Step S68. When it is determined at Step S64 that the character information is included therein (Yes), the main control unit 22 displays the scanned character information in an immediate character editor (immediate character input screen), at Step S66. That is, the main control unit 22 displays the character information extracted from the TV screen as an input character in the immediate character input screen.

When the character information is displayed at Step S66 or when it is determined as No at Step S64, the main control unit 22 determines whether there is any character input, at Step S68. That is, the main control unit 22 determines whether any character has been input through a key operation by the operator. When it is determined at Step S68 that there is the character input (Yes), the main control unit 22 displays the input character, at Step S70. That is, the main control unit 22 displays the character input through the key operation by the operator in the immediate character input screen. When the input character is displayed at Step S70, the main control unit 22 proceeds to Step S72.

When it is determined at Step S68 that there is no character input (No) or when the process of Step S70 is ended, the main control unit 22 determines whether an end instruction of the immediate character processing, that is, ending (completion) of the character input has been detected, at Step S72. When it is determined at Step S72 that the end instruction has not been detected (No), the main control unit 22 proceeds to Step S68, and again determines whether there is any character input. In this manner, the main control unit 22 repeats the process of the character input and the process of displaying the input character until the end instruction is detected.

When it is determined at Step S72 that the end instruction has been detected (Yes), the main control unit 22 determines whether there is any input character string and the process is ended, at Step S74. That is, the main control unit 22 determines whether there is any character string input by the operator other than the character strings extracted from the image at Step S64 and Step S66. When it is determined at Step S74 that there is the character string (Yes), the main control unit 22 displays selection menu items, at Step S76. That is, the main control unit 22 displays the menu to process the character string input by immediate character input. Specifically, the menu including those such as "Entry in Memo", "Entry of Schedule", and "Search" is displayed. When the menu is displayed at Step S76, the main control unit 22 detects a menu selection, at Step S78. That is, the main control unit 22 detects a selection instruction of the menu input by the operator.

When the menu is selected at Step S78, and when it is detected at Step S74 that there is no character string (No), the main control unit 22 executes the menu, at Step S80. When the menu is selected at Step S78, then the main control unit 22 executes the selected menu, while when it is determined at Step S74 that there is no character string (No), then the main control unit 22 executes a preset menu. For example, when it is determined at Step S74 that there is no character string (No), the main control unit 22 performs the Entry of Schedule.

"Entry in Memo" is a process for entering a character string as a memo, "Entry of Schedule" is a process for entering a character string as a schedule, and "Search" is a process for performing a search using a character string as search criteria. In the case of "Entry of Schedule", if a date is written in the character string, the character string excluding the date is entered as a schedule on that date. The menu may be executed only by displaying a process screen for the menu, and, thereafter, it may further be operated by the operator. After the execution of the menu at Step S80, the main control unit 22 ends the process.

Figure 8:
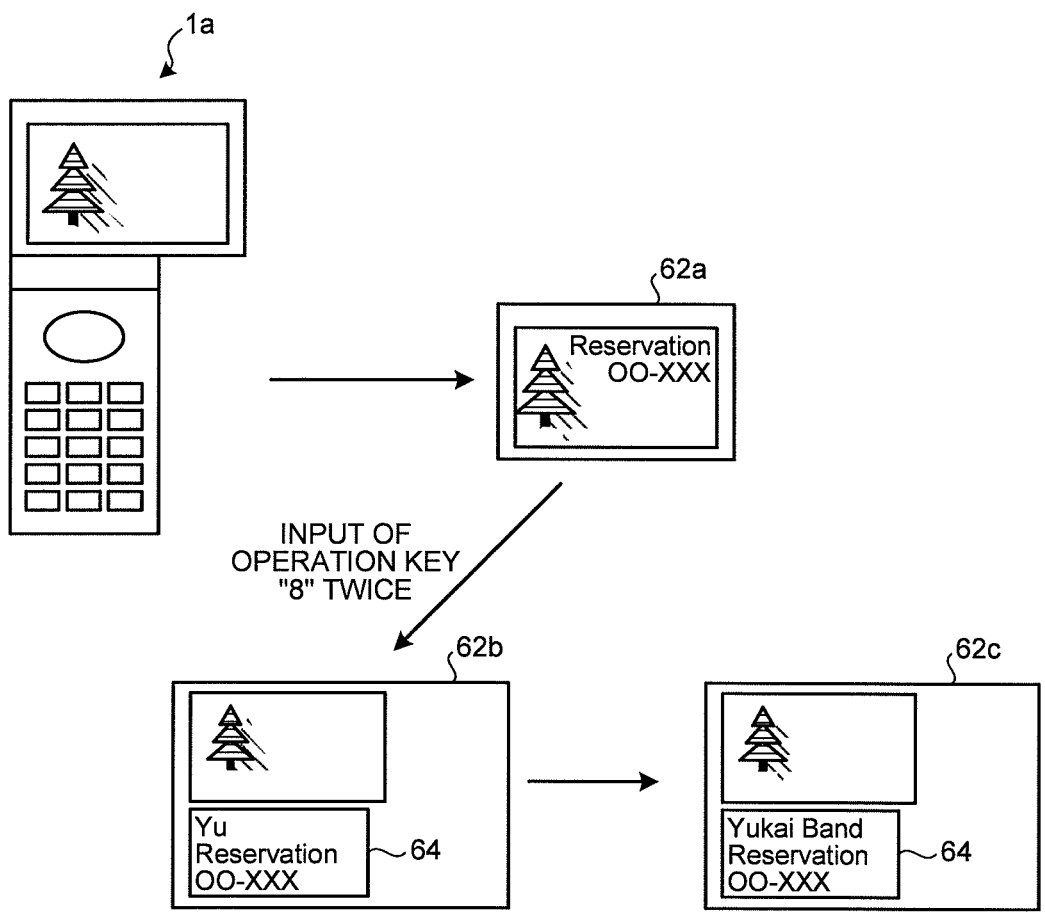
FIG. 8 is an explanatory diagram for explaining operations of the mobile electronic device.

Changes of the display unit will be explained below with reference to FIG. 8. FIG. 8 is an explanatory diagram for explaining operations of the mobile electronic device. First, when the TV function is activated, the TV broadcast of the set channel appears on the display unit 32, as illustrated in the mobile electronic device 1a on the upper left side of FIG. 8. Thereafter, as illustrated in a screen 62a on the upper right side of FIG. 8, an immediate character processing is activated while an image including text, as the TV broadcast, is displayed on the screen 62a of the display unit 32. Specifically, "8" of the operation keys 3 is input (pressed) twice. When "8" of the operation keys 3 is input (pressed) twice, an immediate character editor (input screen) 64 is activated with a character string acquired by scanning the screen, in the present embodiment, with "Ticket Reservation: OO-XXX" input therein, as illustrated in a screen 62b on the lower left side of FIG. 8. Moreover, "Yu" being a character corresponding to two inputs of "8" of the operation keys 3 is also input therein.

Thereafter, when the operator operates the operation keys 3 to further input a character string, the character string of "Yukai Band: Ticket Reservation: OO-XXX" is input in the character editor 64, as illustrated in a screen 62c on the lower right side of FIG. 8. Performed on the input character string is a process such as "Entry in Memo", "Entry of Schedule", and "Search" based on the operator's operation.

In this manner, by scanning the screen of the TV broadcast, acquiring the character information displayed on the screen, and setting the acquired character information as a character string of the immediate character input, it is possible to make a note of the contents of the TV broadcast the operator is viewing, without input of the character string by the operator. This enables the operator's operation to be made more easy.

It may be configured to execute the set menu when the character string for the immediate character input is only the character information captured from the screen of the TV broadcast, thus further improving the operability. For example, the character information captured from the screen of the TV broadcast can be stored as continuous memos by an easy operation.

Figure 9:
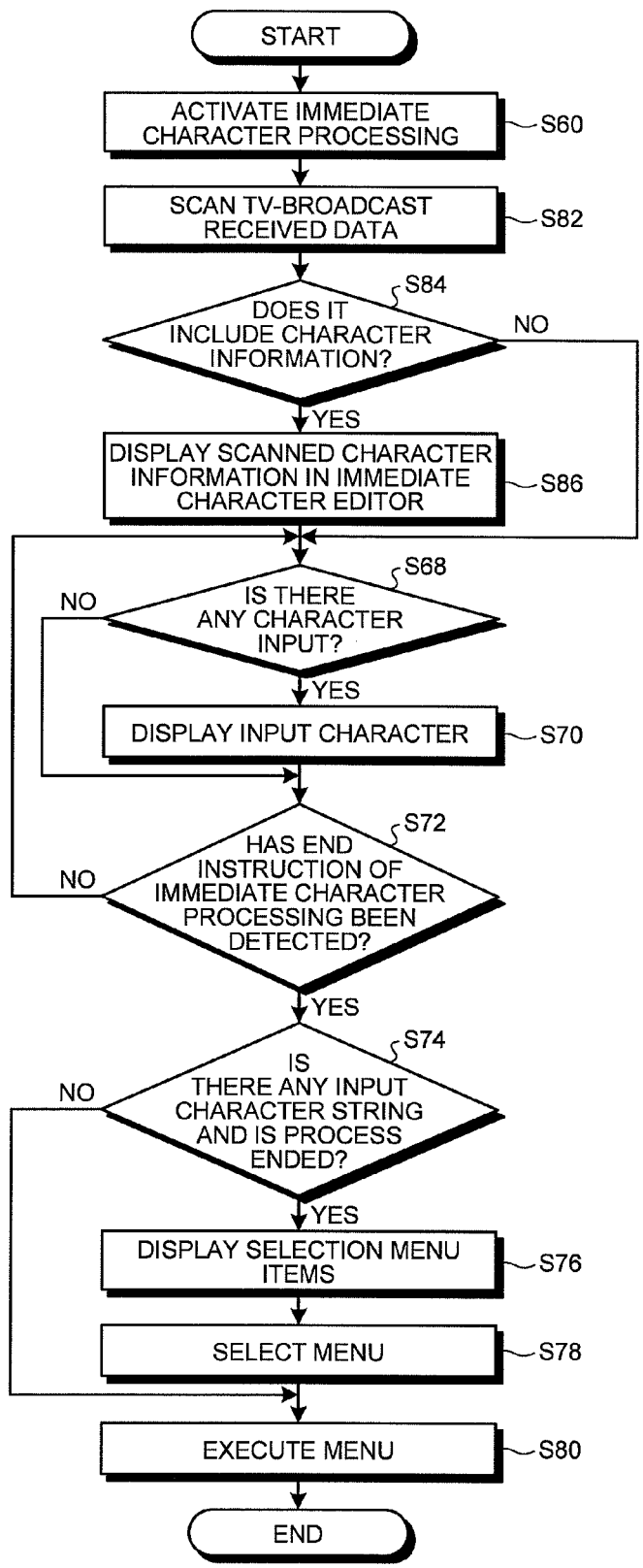
FIG. 9 is a flowchart illustrating another example of the processing operation of the mobile electronic device.

In the embodiment, the screen is scanned to acquire character information, however, the method of acquiring the character information from the TV broadcast is not limited thereto. Another example thereof will be explained below with reference to FIG. 9. FIG. 9 is a flowchart illustrating another example of the processing operation of the mobile electronic device. The flowchart of FIG. 9 includes steps for performing the same processes as these in the flowchart of FIG. 7. Therefore, the same step numbers are assigned to the steps for performing the same processes as these at the steps in FIG. 7 to omit detailed explanation, and processes specific to the flowchart of FIG. 9 will be mainly explained below.

First, the main control unit 22 activates the immediate character processing, at Step S60. After the activation of the immediate character processing at Step S60, the main control unit 22 scans TV-broadcast reception data, at Step S82. That is, the main control unit 22 scans the data received as TV broadcast (e.g., "One Seg" broadcast) and acquires the structure of the received data. In the TV broadcasts, in addition to image data and sound data of the TV broadcast as received data, program information data describing information for programs and the like is also transmitted and received.

After the scan of the received data at Step S82, the main control unit 22 determines whether the scanned data includes character information, at Step S84. When it is determined at Step S84 that the character information is not included therein (No), the main control unit 22 proceeds to Step S68. When it is determined at Step S84 that the character information is included therein (Yes), the main control unit 22 displays the scanned character information in the immediate character editor (immediate character input screen), at Step S86. That is, the character information included in the data received as program information data is displayed as an input character in the immediate character input screen.

When the character information is displayed at Step S86 or when it is determined as No at Step S84, the main control unit 22 determines whether there is any character input, at Step S68. That is, the main control unit 22 determines whether any character has been input through a key operation by the operator. The processes from Step S68 to Step S80 are the same as these in the flowchart of FIG. 7, and therefore explanation thereof is omitted.

In this manner, by acquiring the character information from the program information data sent at the time of TV broadcasting, it is possible to make a note of the contents of the TV broadcast the operator is viewing, without input of the data by the operator, similarly to the case where the screen is scanned. This enables the operator's operation to be made more easy. The data can be directly captured, and therefore the character information can be more accurately acquired than the case where the image is scanned.

Figure 10:
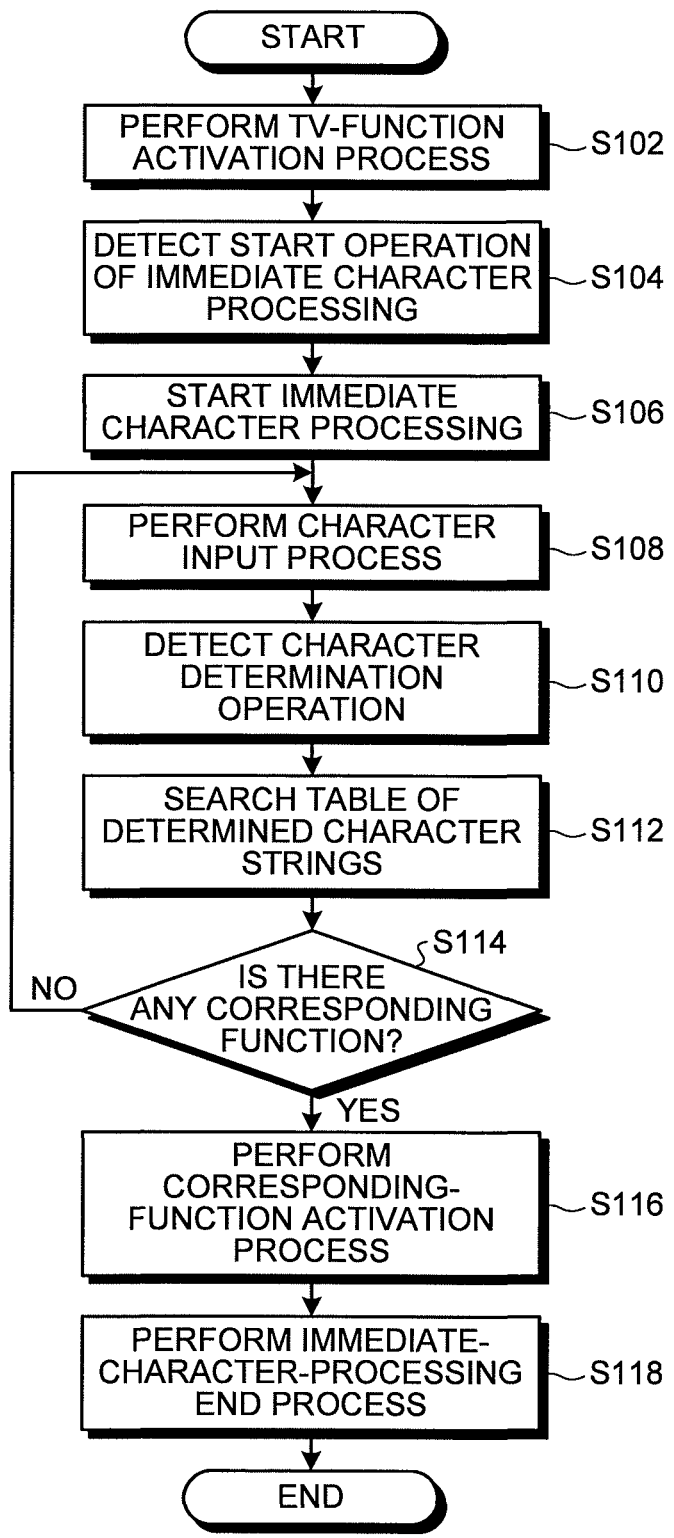
FIG. 10 is a flowchart illustrating another example of the processing operation of the mobile electronic device.
Figure 11:
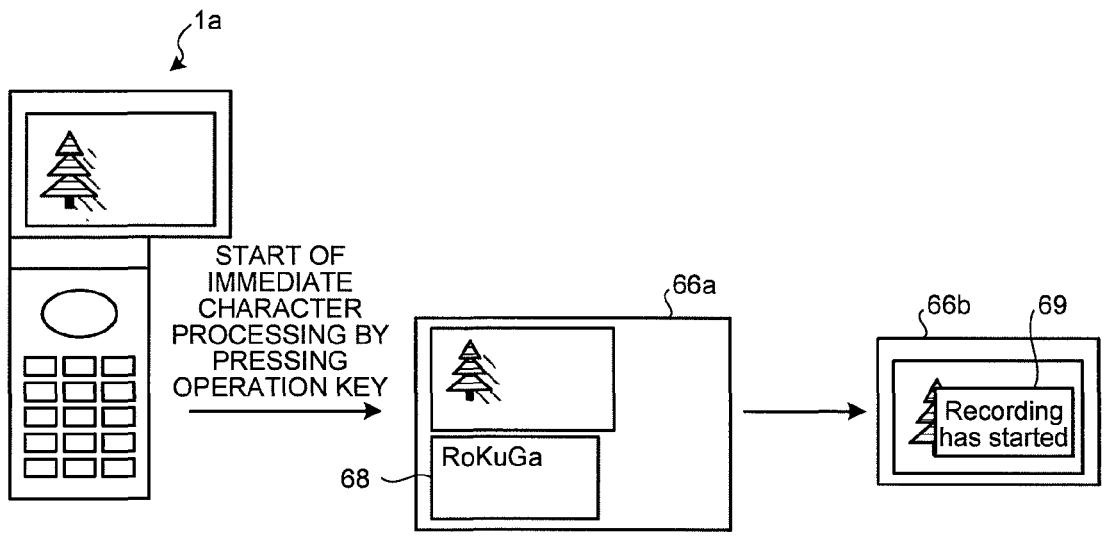
FIG. 11 is an explanatory diagram for explaining operations of the mobile electronic device.

Another example of the processing operation of the mobile electronic device will be explained below with reference to FIG. 10 and FIG. 11. FIG. 10 is a flowchart illustrating another example of the processing operation of the mobile electronic device, and FIG. 11 is an explanatory diagram for explaining operations of the mobile electronic device.

When a TV-function activation instruction is input by the operator, the main control unit 22 performs the TV-function activation process and starts an output of the TV broadcast, at Step S102. When the start operation of the immediate character processing is detected at Step S104 after the output of the TV broadcast is started at Step S102, the main control unit 22 starts the immediate character processing, at Step S106. As explained above, the start operation of the immediate character processing is an operation of pressing the operation key a predetermined number of times within a given time.

After the start of the immediate character processing at Step S106, the main control unit 22 performs the character input process, at Step S108. That is, the main control unit 22 detects the operation of the operation keys 3 by the operator, and creates and displays a character string input through the operation of the operation keys 3. When a character determination operation is detected at Step S110 after the character input process is performed at Step S108, the main control unit 22 searches a table of determined character strings, at Step S112. That is, when the determination operation of the character string input by the operator is detected at Step S110, the main control unit 22 detects the processing operation corresponding to the determined character string using the table, at Step S112. The table stores therein a relation between an input character string and a corresponding processing operation. In the table, for example, a character string "RoKuGa" ("RoKuGa" means "recording" in Japanese) and a processing operation "recording of TV broadcast" are associated with each other, and a character string "ONRyou" ("ONRyou" means "volume" in Japanese) and a processing operation "volume control" are associated with each other. In addition, "mail" and a processing operation "activation of mail function" are associated with each other.

When the table is searched based on the determined character string at Step S112, the main control unit 22 determines whether there is any corresponding function, at Step S114. That is, the main control unit 22 determines whether a processing operation (for the corresponding function) performed by the main control unit 22 has been detected from the determined character string and the table. When it is determined at Step S114 that there is no corresponding function (No), that is, that the processing operation cannot be specified from the determined character string, the main control unit 22 proceeds to Step S108, and again performs the character input process.

When it is determined at Step S114 that there is the corresponding function (Yes), the main control unit 22 performs the corresponding-function activation process, at Step S116. When performing the corresponding-function activation process at Step S116, the main control unit 22 performs an immediate-character-processing end process, at Step S118, terminates the immediate character processing, and ends the process.

Changes of the display unit will be explained below with reference to FIG. 11. First, when the TV function is activated, the TV broadcast of the set channel appears on the display unit 32, as illustrated in the mobile electronic device 1a on the left side of FIG. 11. Thereafter, the immediate character processing is activated, and "RoKuGa" as a character string is input by the operator as illustrated in a screen 66a at the center of FIG. 11, and the character determination operation is performed. At this time, the input character "RoKuGa" appears in a text editor 68 of the screen 66a. In this manner, by performing the character determination operation, a recording process of TV broadcast is detected as the operation corresponding to "RoKuGa", the recording of the TV broadcast is started, and a message 69 indicating "Recording has started" appears on the display unit 32, as illustrated in a screen 66b on the right side of FIG. 11.

In this manner, by detecting the processing operation based on the input character string and executing the processing operation, various operations can be performed without complicated menu operation while the operator is viewing the TV broadcast.

In the embodiment, if the corresponding process cannot be detected from the character string, the character input process is performed, however, the process is not limited thereto.

Therefore, if the corresponding process cannot be detected, the input character string may be stored as a memo.

Figure 12:
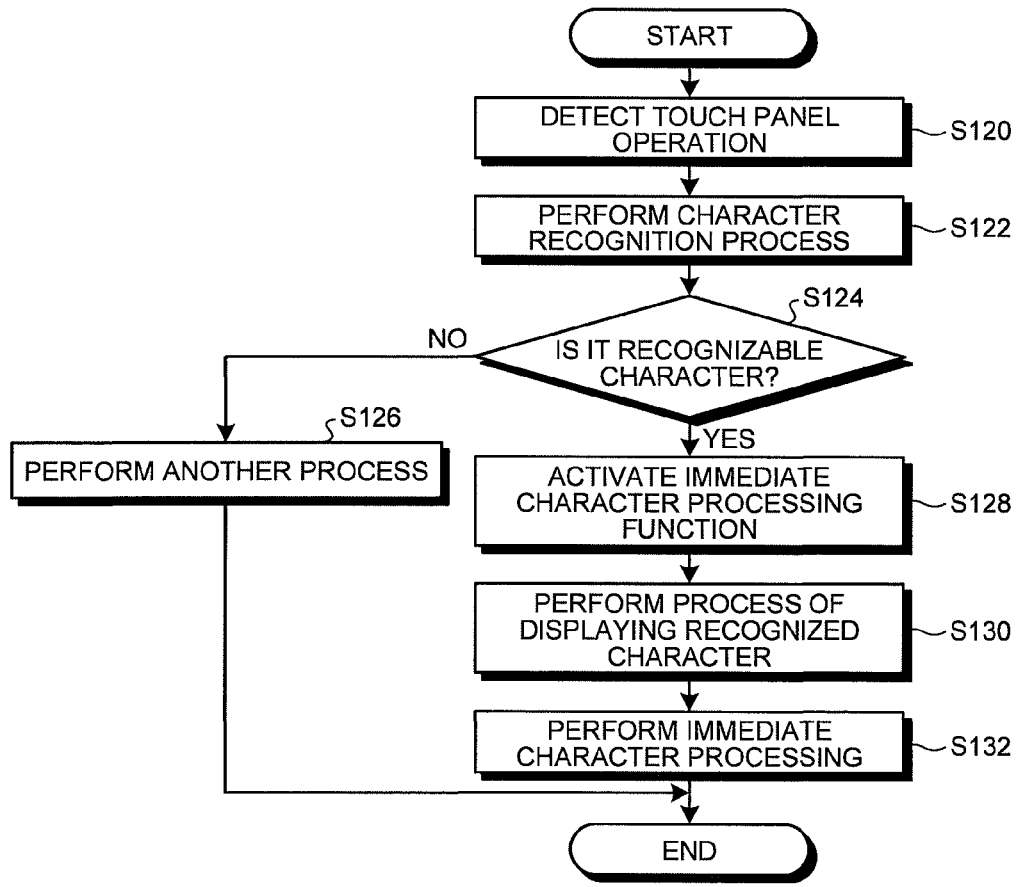
FIG. 12 is a flowchart illustrating another example of the processing operation of the mobile electronic device.
Figure 13:
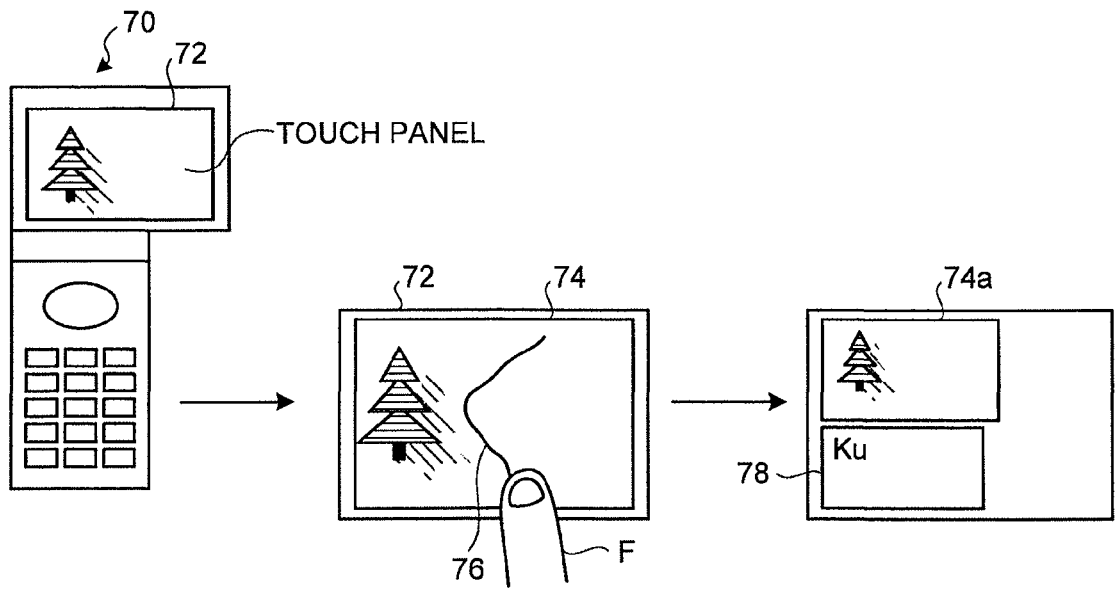
FIG. 13 is an explanatory diagram for explaining operations of the mobile electronic device.

In the embodiment, the operator operates the operation keys to input a character and input an instruction, however, the input device is not limited thereto. For example, a touch panel may be used as the input device. A case where the touch panel is used as the input device will be explained below with reference to FIG. 12 and FIG. 13. FIG. 12 is a flowchart illustrating another example of the processing operation of the mobile electronic device, and FIG. 13 is an explanatory diagram for explaining operations of the mobile electronic device. In the present embodiment, the touch panel is placed on the rear side of the main display 2M, and touching of the main display 2M by the operator is detected as an input. The flowchart illustrated in FIG. 12 is processes when the TV function process is executed and the TV broadcast is output.

First, when detecting a touch panel operation, that is, detecting that the touch panel is operated by the operator, at Step S120, the main control unit 22 performs a character recognition process at Step S122. In other words, the main control unit 22 performs processes for detecting a trail of input to the touch panel, that is, detecting sliding of a touch position (touch point), and recognizing the trail as a character.

When the character recognition process is performed at Step S122, the main control unit 22 determines whether the input by the operator is a recognizable character as a result of processing at Step S122, at Step S124. When it is determined at Step S124 that the input is not the recognizable character (No), that is, that the input detected as an operation at Step S120 cannot be recognized as a character, the main control unit 22 performs another process, at Step S126. As another process, various processes can be performed, for example, if it is determined that the input is an input to the button displayed on the display, a process corresponding to the button input is performed. The TV broadcast may be continuously output without activating any function. The main control unit 22 ends the process after performing another process of Step S126.

When it is determined at Step S124 that the input is the recognizable character (Yes), that is, that the character has been input through the touch panel, the main control unit 22 activates the immediate character processing, at Step S128, and performs the process of displaying the character recognized at Step S122, at Step S130. Thereafter, the main control unit 22 performs immediate character processing at Step S132, and ends the process after the immediate character processing is terminated. The immediate character processing is a process of detecting characters input through the touch panel, creating a character string, and displaying the created character string. The character string created by the immediate character processing is stored as a memo or a schedule.

Next, changes of the display unit will be explained below with reference to FIG. 13. First, when the TV function is activated, the TV broadcast of the set channel appears on the display unit 32 as illustrated in a mobile electronic device 70 on the left side of FIG. 13. Thereafter, the operator draws a trail 76 of "Ku" (Japanese Hiragana character "Ku" has an appearance like the trail 76) with his/her finger F on a screen 74 of a main display (touch panel) 72, as illustrated in the main display 72 at the center of FIG. 13. In this manner, when the operator operates the touch panel and the operation unit 28 detects an input, the immediate character processing is activated, and "Ku" is displayed in a field where the input character is displayed, as illustrated in the main display 72 on the right side of FIG. 13. Thereafter, the operator further writes a character on the main display (touch panel) 72, and the written character is thereby displayed in a field 78 where the input character is displayed. At this time, a screen 74a of the TV broadcast is also displayed.

In this manner, even if the touch panel 72 is used as the input device, by activating the character input function in response to detection of an input of a character and displaying the input character, the character input becomes possible by drawing the character on the input device even during displaying of the TV broadcast. This enables the operator to input the character without suspension of the TV broadcast, so that the character input can be performed by an easy operation. In addition, the operator can start the character input while viewing the TV broadcast.

In the present embodiment, the immediate character processing is started in response to detection of a character, however, the process is not limited thereto. Therefore, similarly to the flowcharts illustrated in FIG. 4 and FIG. 6, it may be configured to determine whether the input is a channel change instruction or a character input, and to start the immediate character processing after it is detected that the input is the character input. For example, when the input character is a number, a subsequent input may be awaited, and when there is an input exceeding the number of channels, then the immediate character processing may be started. With these processes, the change of the channel and the input of a character can be performed without a particular operation.

In the embodiment, the examples have been discretely explained in order to simplify the explanation, however, it goes without saying that the processes of embodiments may be combined with each other. For example, when the immediate character processing is started in the process of FIG. 4, the processes of FIG. 7 and FIG. 9 may be preformed. In addition, it is preferable that the processes of FIG. 7 and FIG. 9 can be selected by setting. With this feature, when there is no need to extract a character string from the screen or the data, the character string can be prevented from being extracted.

Next, another example of the electronic device will be explained below. The present embodiment is also an example of the case where a mobile phone being one example of the mobile electronic device is used as the electronic device. As a configuration (outer shape) of the mobile electronic device, the configuration of the cycloid-type as illustrated in FIG. 1, the configuration of a so-called folding type mobile electronic device 1 formed with the two housings: the second housing with the operation unit 28 and the first housing with the display unit 32, or the like can be used. However, the configuration of the mobile electronic device according to the present invention is not limited thereto. For example, any configuration may be used such as a slide type in which both housings of the second housing and the first housing are overlapped and one of the housings is slid in one direction from the overlapped state, a rotation type (turn type) in which one of housings is rotated around an axis line along their overlapping direction, and a type (a straight type or a flip type) in which the operation unit 28 and the display unit 32 are arranged in one housing without a connection therebetween.

The mobile electronic device according to the present embodiment includes an interface for performing communication with an external device (e.g., a host apparatus), a side key assigned with a predetermined function, and an interface into and from which an external memory is inserted and removed, which are provided on the side face of the second housing (operation-unit-side housing) (not illustrated).

Figure 14:
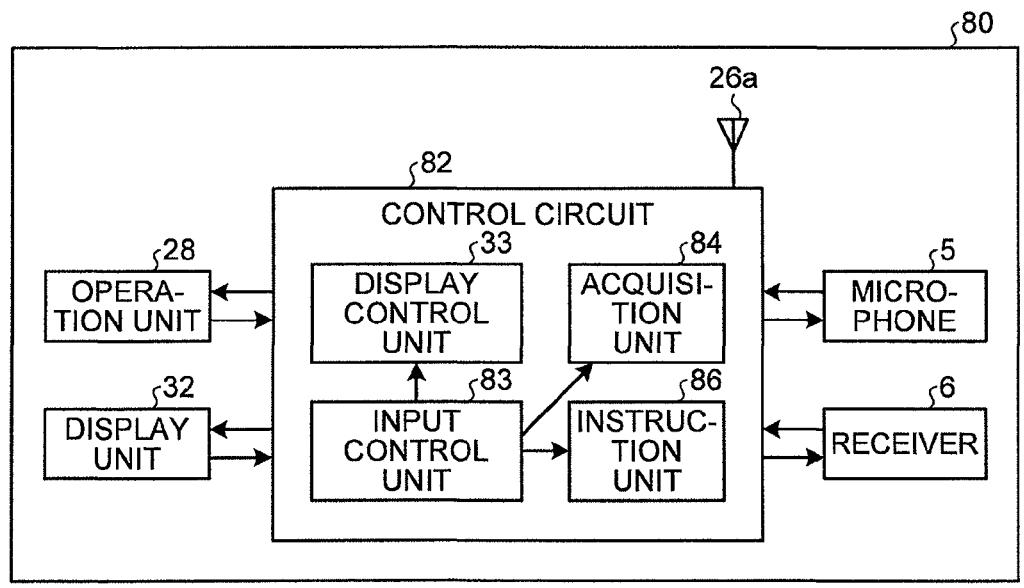
FIG. 14 is a block diagram illustrating a schematic configuration of another example of the functions of the mobile electronic device.
Figure 15:
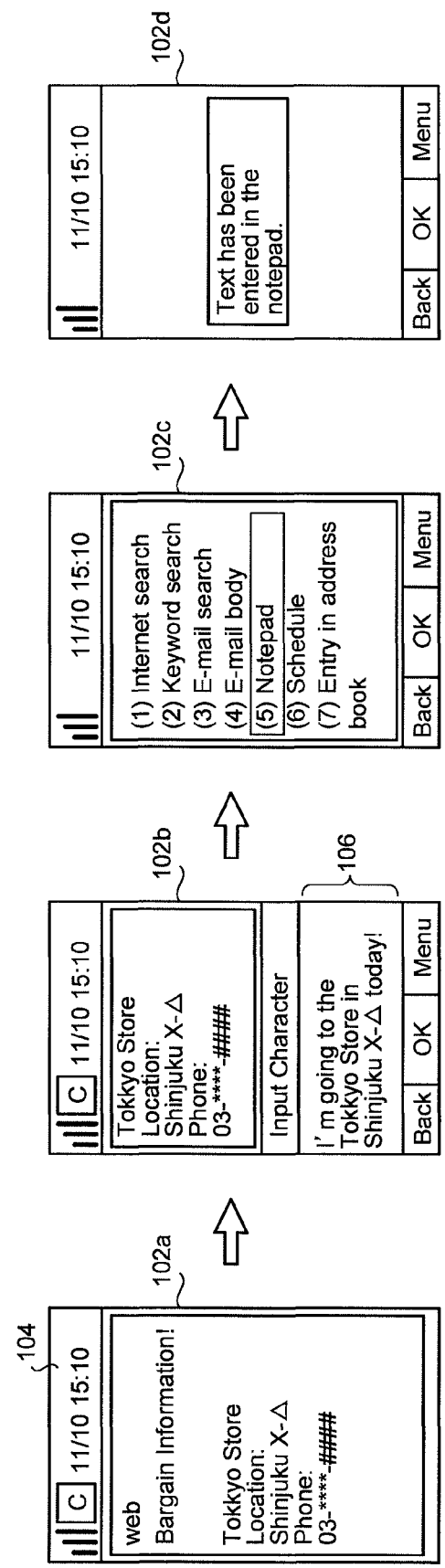
FIG. 15 is an explanatory diagram for explaining operations of the mobile electronic device.

FIG. 14 is a function block diagram illustrating a schematic configuration of the functions of the mobile electronic device, and FIG. 15 is an explanatory diagram for explaining operations of the mobile electronic device. As illustrated in FIG. 14, a mobile electronic device 80 includes the operation unit 28, the display unit 32, the microphone 5, and the receiver 6, and a controller 82 is provided inside thereof. The microphone 5, the receiver 6, the operation unit 28, and the display unit 32 are configured basically in the same manner as the units as explained above, respectively.

The operation unit 28 is formed with an application execution key for executing each of applications such as a phone book application, a mail application, and a Web application; the operation keys 3 (input operation keys) for inputting numbers of a phone number, characters of mail, and the like; and the direction and decision key (decision operation key) 4 for causing each of the operations to be decided and for scrolling in vertical and horizontal directions. A predetermined function is assigned to each of the keys according to a type of the activated applications. The user of the mobile electronic device 80 operates, that is, presses each of the keys, so that the operation according to the function assigned to the operated key is executed.

An initial screen is displayed on the display unit 32 when it is in a communication standby state and a predetermined application is not activated, while when a predetermined application is activated, a screen is displayed based on the operation of the application.

When an application capable of a character input is activated, the display unit 32 displays a character input area in which the character input corresponding to the activated application is possible. Specifically, the character input area is an area for inputting characters as a mail subject and a mail body when the mail application is activated, and for inputting characters as a search target on the Web when the Web application is activated. In this manner, the characters input to the character input area can be used only in the corresponding activated application.

In the present embodiment, when the Web application is activated, the display unit 32 displays an input-character display area for inputting characters by the operation through the operation unit 28. The characters input into the input-character display area, unlike the characters input into the character input area, can be used in a desired application among a plurality of applications in which the character input is possible. Details thereof will be explained later.

The controller (control circuit) 82 controls the whole of the mobile electronic device 80, is configured with a central processing unit (CPU) and the like, and includes an input control unit (input-data acquisition unit) 83, the display control unit 33, an acquisition unit 84, and an instruction unit 86.

The input control unit 83 includes the same function as that of the input-data acquisition unit 29, performs control on the input contents according to the operation through the operation unit 28, and sends a signal of the input contents to the display control unit 33, the acquisition unit 84, and the instruction unit 86. Specifically, when a key assigned with, for example, a number of "1" and characters of "A", "I", "U", "E", "O", among a plurality of keys provided in the operation unit 28, is operated while the initial screen is displayed on the display unit 32, the input control unit 83 inputs the number of "1", and sends a signal indicating the input of the number of "1" to the display control unit 33. Moreover, when, for example, the key for activating the Web application, among the keys provided in the operation unit 28, is operated while the initial screen is displayed on the display unit 32, the input control unit 83 inputs an instruction for the Web application, and sends a signal indicating the input of the instruction for the Web application to the acquisition unit 84 and the instruction unit 86. In addition, when, for example, the key for activating the mail application, among the keys provided in the operation unit 28, is operated while the initial screen is displayed on the display unit 32, the input control unit 83 inputs an instruction for the mail application, and sends a signal indicating the input of the instruction for the mail application to the instruction unit 86.

In the present embodiment, when an instruction for an application capable of the character input is given while the Web application is activated and characters are displayed in the input-character display area for displaying the characters input by the operation through the operation unit 28, the input control unit 83 transmits information for the characters displayed in the input-character display area to the application. Specifically, when an instruction for the notepad application is given while "It is fine today, isn't it?" is displayed in the input-character display area, the input control unit 83 enters "It is fine today, isn't it?" in the notepad.

In the present embodiment, when an instruction for an application capable of the character input is given and the application is activated while the Web application is activated and characters are displayed in the input-character display area for displaying the characters input by the operation through the operation unit 28, the input control unit 83 inputs the characters displayed in the input-character display area into the character input area of the application. Specifically, when the mail application is activated while "It is fine today, isn't it?" is displayed in the input-character display area, the input control unit 83 inputs the character string "It is fine today, isn't it?" into a character input area of the mail body corresponding to the mail application.

The display control unit 33 performs control on the display contents of the display unit 32 according to the signal sent from the input control unit 83. Specifically, when receiving the signal indicating the input of the number "1" from the input control unit 83, the display control unit 33 displays the number "1" on the display unit 32. Moreover, in the present embodiment, when an operation through the operation unit 28 is performed while the Web application is activated and Web page information is displayed on the display unit 32, the display control unit 33 keeps displaying at least part of the Web page information and displays the input-character display area for inputting characters through the operation unit 28 on the display unit 32.

The acquisition unit 84 acquires Web page information through a communication network (and the communication unit 26) according to the signal from the input control unit 83. Specifically, when receiving the signal indicating the input of the instruction for the Web application from the input control unit 83, the acquisition unit 84 starts acquiring the Web page information through the communication network.

The instruction unit 86 performs an instruction for a predetermined application according to the signal sent from the input control unit 83. The instruction unit 86 also activates the application by the instruction for the predetermined application. Specifically, when receiving the signal indicating an input of the instruction for the mail application from the input control unit 83, the instruction unit 86 performs the instruction for the mail application, and activates the mail application. In addition, when receiving the signal indicating an input of the instruction for the notepad application from the input control unit 83, the instruction unit 86 performs the instruction for the notepad application. In this case, the instruction unit 86 performs the instruction for the notepad application but needs not necessarily perform activation of the notepad application.

The embodiment according to the present invention will be explained below with reference to FIG. 15. First, the mobile electronic device 80 includes, as explained above, the acquisition unit 84 for acquiring Web page information through the communication network; the display unit 32 for displaying at least the Web page information; the operation unit 28 for inputting a character; the instruction unit 86 for giving an instruction for an application capable of the character input; the display control unit 33 that keeps displaying at least part of the Web page information on the display unit 32 and displays the input-character display area for inputting characters through the operation unit 28 on the display unit 32 when an operation is performed through the operation unit 28 while the Web page information is displayed on the display unit 32; and the input control unit 83 for transmitting, when an instruction for an application capable of the character input is issued by the instruction unit 86 while characters are input in the input-character display area, information for the characters in the input-character display area to the application.

Specifically, as illustrated in a screen 102a of FIG. 15, when an operation is performed through the operation unit 28 while the Web page information acquired by the acquisition unit 84 is displayed on the display unit 32, the display control unit 33 keeps displaying at least part of the Web page information on the display unit 32 and displays an input-character display area 106 for inputting characters through the operation unit 28, as illustrated in a screen 102b of FIG. 15. The operation through the operation unit 28 may be an operation using any key of the input operation keys 3 for inputting numbers of a phone number, characters of mail, and the like, or may be an operation using a function key for performing the character input during browsing the Web. As illustrated in the screen 102b of FIG. 15, part of the Web page information is displayed on the display unit 32 together with an input-character display area 106 for inputting characters through the operation unit 28, and therefore the user can perform the character input while viewing the part of the Web page information. Specifically, the user can input "I'm going to the Tokkyo Store in Shinjuku X-Δ today!" while viewing the part of the Web page information, as illustrated in the screen 102b of FIG. 15.

Subsequently, for example, when a menu key near the lower right end of the screen 102b in FIG. 15 among the keys provided in the operation unit 28 is operated while the characters are input in the input-character display area 106, the display control unit 33 of the mobile electronic device 80 displays a plurality of applications capable of the character input, as illustrated in a screen 102c of FIG. 15. Thereafter, for example, when the notepad application is selected from among a plurality of applications capable of inputting characters, the input control unit 83 inputs an instruction for the notepad application, and transmits the character information "I'm going to the Tokkyo Store in Shinjuku X-Δ today!" displayed in the input-character display area 106 to the notepad application. In other words, in the present embodiment, text "I'm going to the Tokkyo Store in Shinjuku X-Δ today!" displayed in the input-character display area 106 is entered in the notepad. When the entry in the notepad is completed, the display control unit 33 of the mobile electronic device 80 displays a message of "Text has been entered in the notepad." as illustrated in a screen 102d of FIG. 15.

Next, another embodiment according to the present invention will be explained with reference to FIG. 16. In the present embodiment, the application executed by the mobile electronic device 80 is an application capable of the character input, and includes a character input area for inputting characters. When an application capable of the character input is activated by an instruction for the application by the instruction unit 86 while text is input in the input-character display area, the input control unit 83 inputs the text in the input-character display area into the character input area provided in the application.

Figure 16:
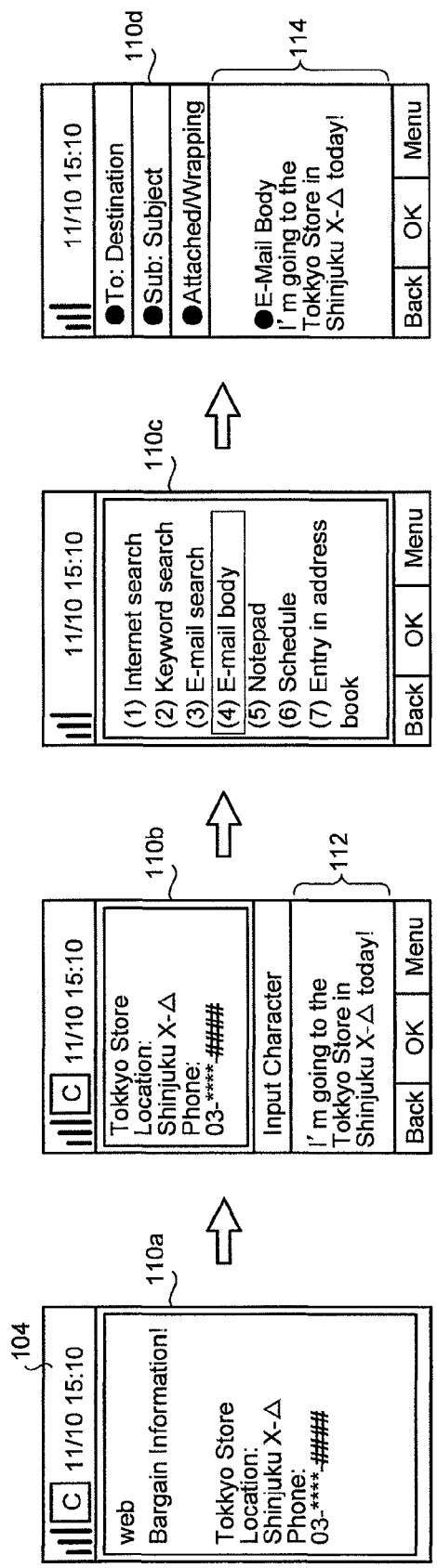
FIG. 16 is an explanatory diagram for explaining operations of the mobile electronic device.

Specifically, as illustrated in a screen 110a of FIG. 16, when an operation is performed through the operation unit 28 while the Web page information acquired by the acquisition unit 84 is displayed in a display area 104 of the display unit 32 (in a predetermined area of the display unit 32, for example, the main display 2M), the display control unit 33 keeps displaying at least part of the Web page information in the display area 104 and displays an input-character display area 112 for inputting characters through the operation unit 28, as illustrated in a screen 110b of FIG. 16. The operation through the operation unit 28 may be an operation using any key of the input operation keys 3 for inputting numbers of a phone number, characters of mail, and the like, or may be an operation using a function key for performing the character input during browsing the Web. In the present embodiment, the character input operation for inputting a character string "I'm going to the Tokkyo Store in Shinjuku X-Δ today!" is performed, and the input character string is displayed in the input-character display area 112. As illustrated in the screen 110b of FIG. 16, the part of the Web page information is displayed together with the input-character display area 112 for inputting characters through the operation unit 28 in the display area 104, and therefore the user can perform the character input while looking at this information. Specifically, the user can input "I'm going to the Tokkyo Store in Shinjuku X-Δ today!" while looking at the Web page information, as illustrated in the screen 110b of FIG. 16.

Subsequently, for example, when the menu key near the lower right end of the screen 110b in FIG. 16 among the keys provided in the operation unit 28 is operated while the characters are input in the input-character display area 112, the display control unit 33 displays a plurality of applications capable of the character input, as illustrated in a screen 110c of FIG. 16. When, for example, the mail body of the mail application is selected from among a plurality of applications capable of inputting characters, the input control unit 83 inputs the text "I'm going to the Tokkyo Store in Shinjuku X-Δ today!" displayed in the input-character display area 112 into a character input area 114 of the mail body of the mail application activated by the instruction for the mail application, and displays the input text, as illustrated in a screen 110d of FIG. 16.

Figure 17:
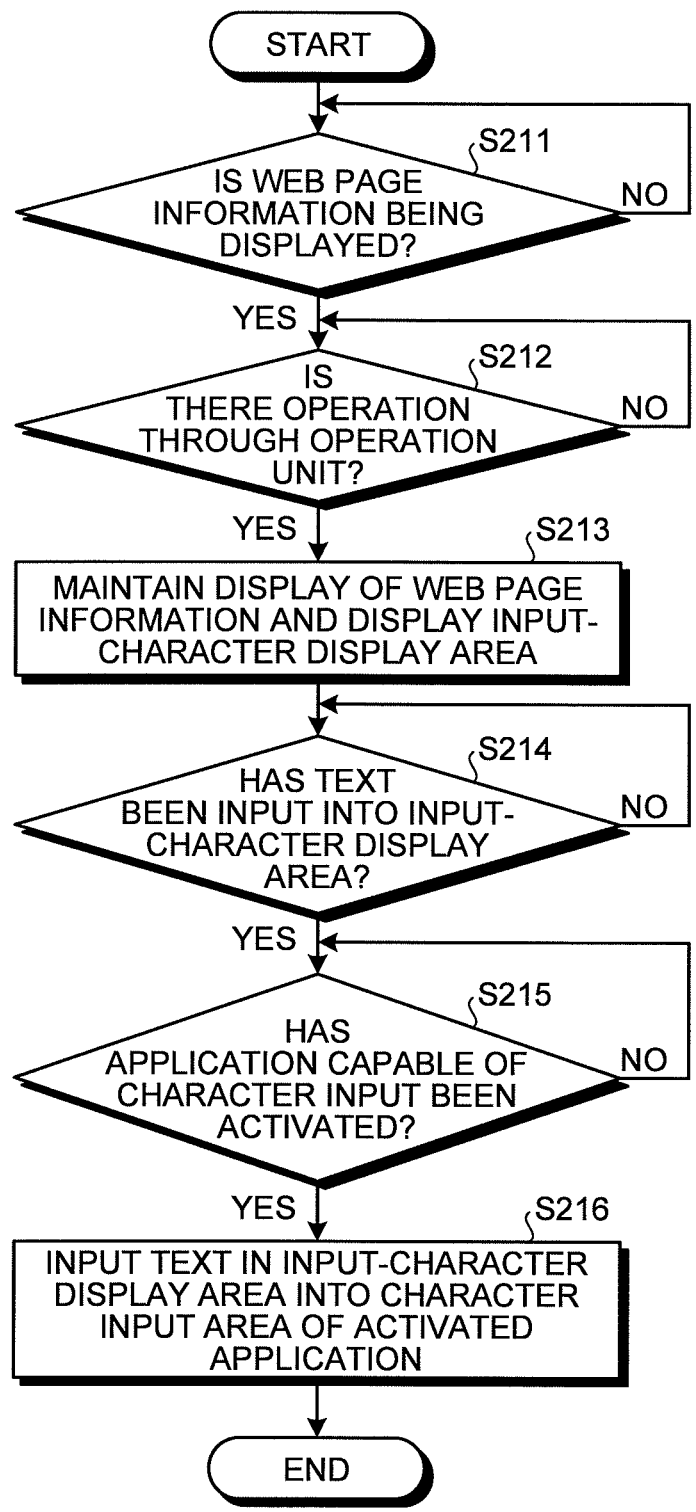
FIG. 17 is a flowchart illustrating one example of the processing operation of the mobile electronic device.

The specific process flow will be explained below using the flowchart of FIG. 17. The present flowchart starts from a state where the initial screen is displayed in the display area 104 of the display unit 32 (a state where a predetermined application is not executed). When the user operates the operation unit 28 while the initial screen is displayed in the display area 104 of the display unit 32, the instruction unit 86 performs an instruction for the predetermined application according to the signal sent from the input control unit 83, and activates the application according to the instruction. For example, when the user operates the key to activate the Web application among the keys provided in the operation unit 28, the instruction unit 86 performs an instruction for the Web application, and activates the Web application by the instruction. The acquisition unit 84 acquires Web page information through the communication network.

First, the controller 82 (mobile electronic device 80) determines whether the Web page information is displayed in the display area 104 of the display unit 32 (Step S211). That is, the controller 82 determines whether the Web application is activated by the instruction for the Web application by the instruction unit 86 and the Web page information acquired by the acquisition unit 84 is displayed in the display area 104. When it is determined that the Web page information is not displayed in the display area 104 (No at Step S211), the controller 82 again performs the process of Step S211. When it is determined that the Web page information is displayed on the display unit 32 (Yes at Step S211), the controller 82 determines whether there is an operation through the operation unit 28 (Step S212). When it is determined that there is no operation through the operation unit 28, that is, that an operation is not input to the operation unit 28 (No at Step S212), the controller 82 again performs the process of Step S212. When it is determined that there is an operation through the operation unit 28 (Yes at Step S212), the controller 82 keeps displaying at least part of the Web page information on the display unit 32 and displays the input-character display area 112 in the display area 104 by the display control unit 33 (Step S213).

Subsequently, the controller 82 determines whether text has been input into the input-character display area 112 (Step S214). When it is determined that the text has not been input (No at Step S214), the controller 82 again performs the process of Step S214. When it is determined that the text has been input (Yes at Step S214), the controller 82 determines whether the application has been activated by the instruction for the application capable of the character input performed by the instruction unit 86 (Step S215). When it is determined that the application capable of the character input has not been activated (No at Step S215), the controller 82 again performs the process of Step S215. When it is determined that the application capable of the character input has been activated (Yes at Step S215), the controller 82 causes the input control unit 83 to input the text in the input-character display area 112 into the character input area 114 of the application (Step S216). This enables the user to easily perform the character input even during browsing the Web.

This is the end of the present flowchart.

The embodiment is provided to easily understand the present invention and is therefore not provided to limitedly construe the present invention. It goes without saying that the present invention may be changed and modified without departing the spirit of the present invention and includes equivalents thereof. The embodiment particularly explained below is also included in the present invention.

Figure 18:
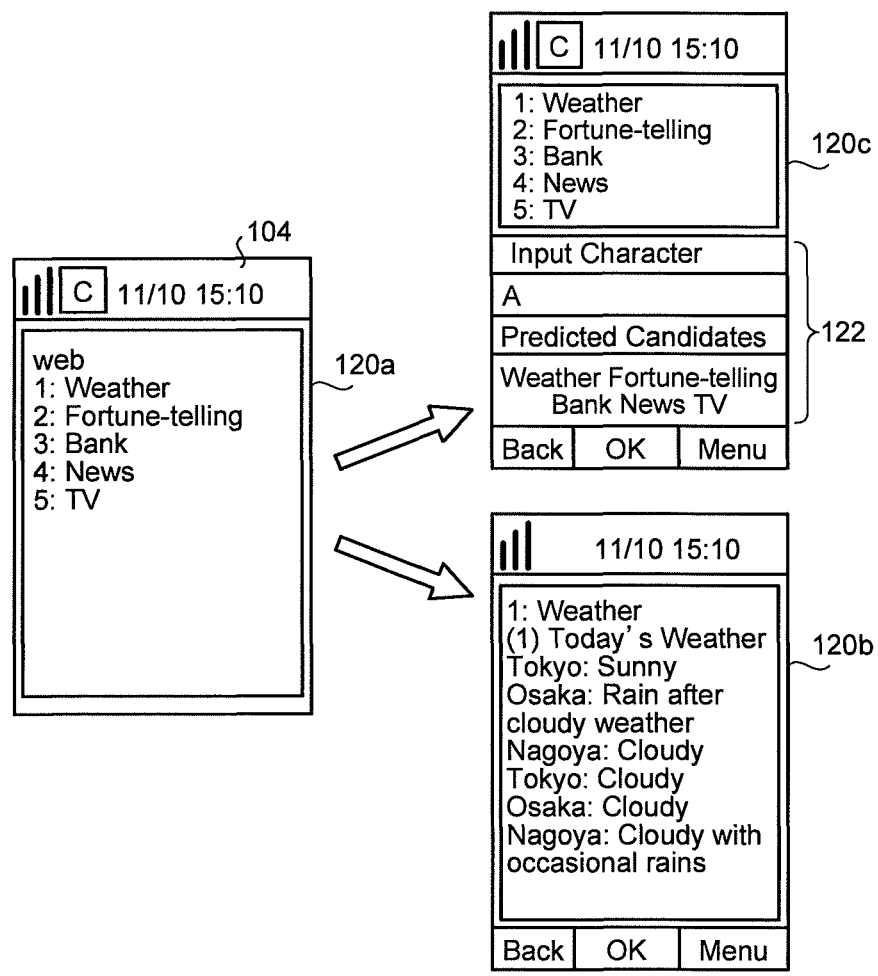
FIG. 18 is an explanatory diagram for explaining operations of the mobile electronic device.

Another embodiment will be explained with reference to FIG. 18. In the present embodiment, when an operation is performed through the operation unit 28 while the Web page information is displayed in the display area 104, the display control unit 33 determines whether the operation is an operation for the Web page information or an operation for the character input. When it is determined that the operation is for the character input, the display control unit 33 displays the input-character display area 112 for inputting the text through the operation unit 28 in the display area 104. Thus, when an operation is performed through the operation unit 28 during browsing the Web, the display control unit 33 performs the process for the Web if the operation is the process for the Web, and the display control unit 33 displays the input-character display area 112 if the operation is for the character input, so that the character input can be easily performed even during browsing the Web.

Specifically, the operation for the Web page information through the operation unit 28 includes, for example, a scroll operation for the Web page information displayed on the display unit 32 and an operation for browsing Web page information linked to the Web page information displayed in the display area 104. For example, when the key assigned with the number of "1", the characters of "A", "I", "U", "E", "O", and the like is pressed within a predetermined time in order to browse Web page information linked to "1: Weather" of the Web page information displayed in the display area 104 while the screen as illustrated in a screen 120a of FIG. 18 is displayed on the display unit 32, the controller 82 displays the Web page information linked to "1: Weather" in the display area 104, as illustrated in a screen 120b of FIG. 18.

The operation for the character input that is an operation input to the operation unit 28 includes, for example, a character input operation for making a note of the Web page information displayed on the display unit 32. For example, when the key assigned with the number of "1", the characters of "A", "I", "U", "E", "O", and the like is pressed for a predetermined time or more while the screen as illustrated in the screen 120a of FIG. 18 is displayed on the display unit 32, the controller 82 keeps displaying part of the Web page information, displays an input-character display area 122 for inputting a character through the operation unit 28, and displays the character "A" assigned to the operated key, as illustrated in a screen 120c of FIG. 18. Whether the operation is an operation for the Web page information or an operation for the character input may be determined based on whether the key operation is long pressing or short pressing. The operation of the direction and decision key 4 for performing scrolling in the vertical and horizontal directions may be determined as an operation for the Web page information, while the operation of the input operation keys 3 (numerical keypad 3a) for inputting numbers of a phone number, characters of mail, and the like may be determined as an operation for the character input.

Figure 19:
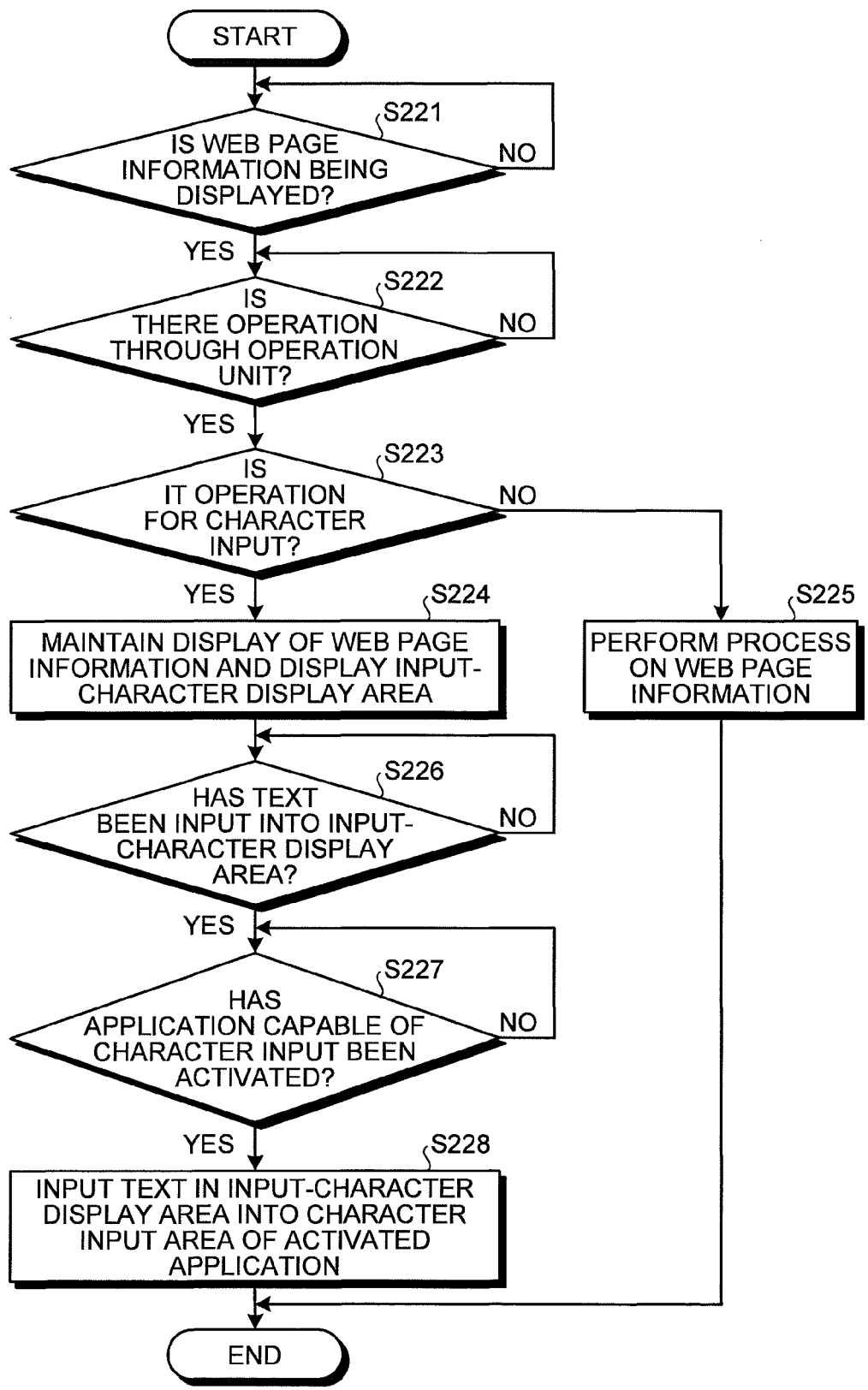
FIG. 19 is a flowchart illustrating one example of the processing operation of the mobile electronic device.

The specific process flow will be explained below using the flowchart of FIG. 19. The present flowchart illustrated in FIG. 19 starts from a state where the initial screen is displayed in the display area 104 of the display unit 32 (a state where a predetermined application is not executed). When the user operates the operation unit 28 while the initial screen is displayed in the display area 104 of the display unit 32, the instruction unit 86 performs an instruction for a predetermined application according to the signal sent from the input control unit 83 and activates the application by the instruction. For example, the user operates the key to activate the Web application among the keys provided in the operation unit 28, the instruction unit 86 performs an instruction for the Web application and activates the Web application, and the acquisition unit 84 acquires the Web page information through the communication network.

First, the controller 82 determines whether the Web page information is displayed in the display area 104 of the display unit 32 (Step S221). Specifically, the controller 82 determines whether the Web application is activated by the instruction for the Web application by the instruction unit 86 and the Web page information acquired by the acquisition unit 84 is displayed on the display unit 32 (Step S221). When it is determined that the Web page information is not displayed in the display area 104 (No at Step S221), the controller 82 again performs the process of Step S221. When it is determined that the Web page information is displayed in the display area 104 (Yes at Step S221), the controller 82 determines whether there is an operation through the operation unit 28 (Step S222). When it is determined that there is no operation through the operation unit 28, that is, that an operation is not an input to the operation unit 28 (No at Step S222), the controller 82 again performs the process of Step S222. When it is determined that there is an operation through the operation unit 28 (Yes at Step S222), the controller 82 determines whether the operation is an operation for the character input (Step S223). When it is determined that the operation is for the character input (Yes at Step S223), the controller 82 keeps displaying at least part of the Web page information and displays the input-character display area 112 in the display area 104 by the display control unit 33 (Step S224). When it is determined that the operation is not for the character input (No at Step S223), the controller 82 performs the process for the Web page information displayed in the display area 104 (Step S225). After the process of Step S225 is performed, the controller 82 ends the process.

After the process of Step S224 is performed, the controller 82 determines whether text has been input in the input-character display area 112 (Step S226). When it is determined that the text has not been input (No at Step S226), the controller 82 again performs the process of Step S226. When it is determined that the text has been input (Yes at Step S226), the controller 82 determines whether the application has been activated by the instruction for the application capable of the character input performed by the instruction unit 86 (Step S227). When it is determined that the application capable of the character input has not been activated (No at Step S227), the controller 82 again performs the process of Step S227. When it is determined that the application capable of the character input has been activated (Yes at Step S227), the controller 82 causes the input control unit 83 to input the text in the input-character display area 112 into the character input area 114 of the application (Step S228). After the process of Step S228 is performed, the controller 82 ends the process. Thus, when an operation is performed through the operation unit 28 during browsing the Web, the mobile electronic device 80 performs the process for the Web if the operation is the process for the Web, and displays the input-character display area 112 if the operation is for the character input, so that the character input can be easily performed even during browsing the Web.

This is the end of the present flowchart.

Another embodiment will be explained below with reference to FIG. 20. In the present embodiment, the input control unit 83 inputs character information extracted from the Web page information displayed in the display area 104 into the input-character display area.

Figure 20:
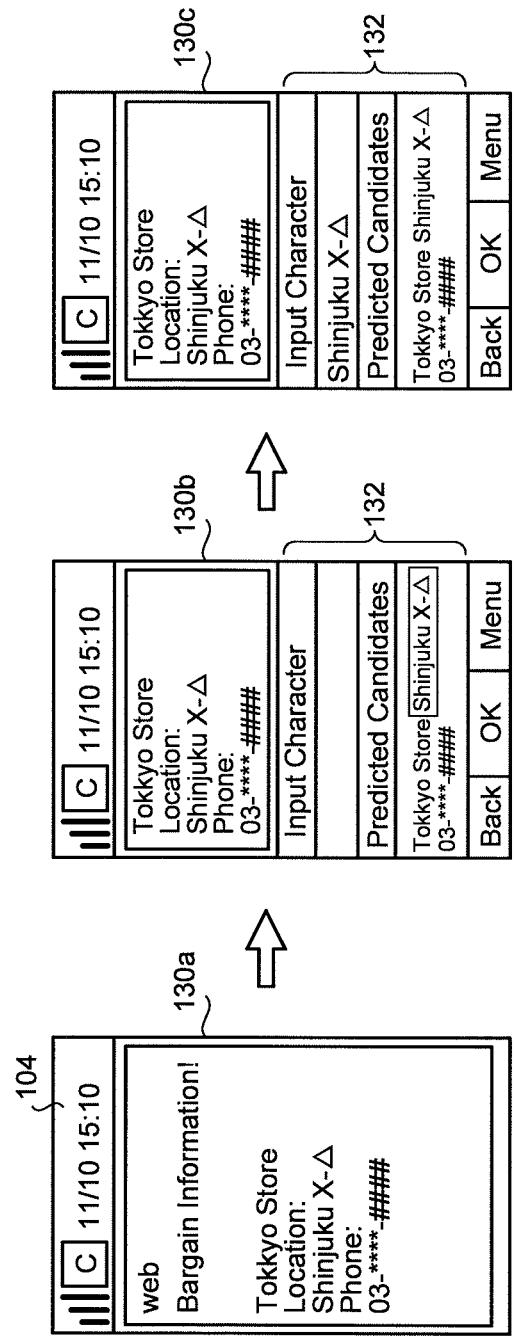
FIG. 20 is an explanatory diagram for explaining operations of the mobile electronic device.

Specifically, when an operation is performed through the operation unit 28 while the Web page information acquired by the acquisition unit 84 is displayed on the display unit 32 as illustrated in a screen 130a of FIG. 20, the display control unit 33 keeps displaying at least part of the Web page information in the display area 104 and displays an input-character display area 132 for inputting text through the operation unit 28 also in the display area 104, as illustrated in a screen 130b of FIG. 20. In the present embodiment, as illustrated in the screen 130b of FIG. 20, the controller 82 inputs the character information extracted from the Web page information displayed in the display area 104 into the input-character display area 132. For example, in the screen 130b of FIG. 20, the character information is displayed in the input-character display area 132 as predicted candidates. For example, "Shinjuku X-Δ" is selected from among predicted candidates, and the input control unit 83 thereby inputs the selected "Shinjuku X-Δ" into the input-character display area 132 as illustrated in a screen 130c of FIG. 20. This enables the text to be easily input when the user wants to write a memo of the text on the Web page information.

Another embodiment will be explained below with reference to FIG. 21. A mobile electronic device 150 illustrated in FIG. 21 has a plurality of keys provided in the operation unit 28 which are arranged in respectively different positions. The display area 104 of the display unit 32 is divided into a plurality of display areas in such a manner that the display areas correspond to the positions where the keys are arranged respectively, and the Web page information is displayed in the display area 104. When an operation is performed through the operation unit 28, the mobile electronic device 150 inputs character information extracted from the display area 104 of the display unit 32 corresponding to the position where the operated key is arranged, into the input-character display area.

Figure 21:
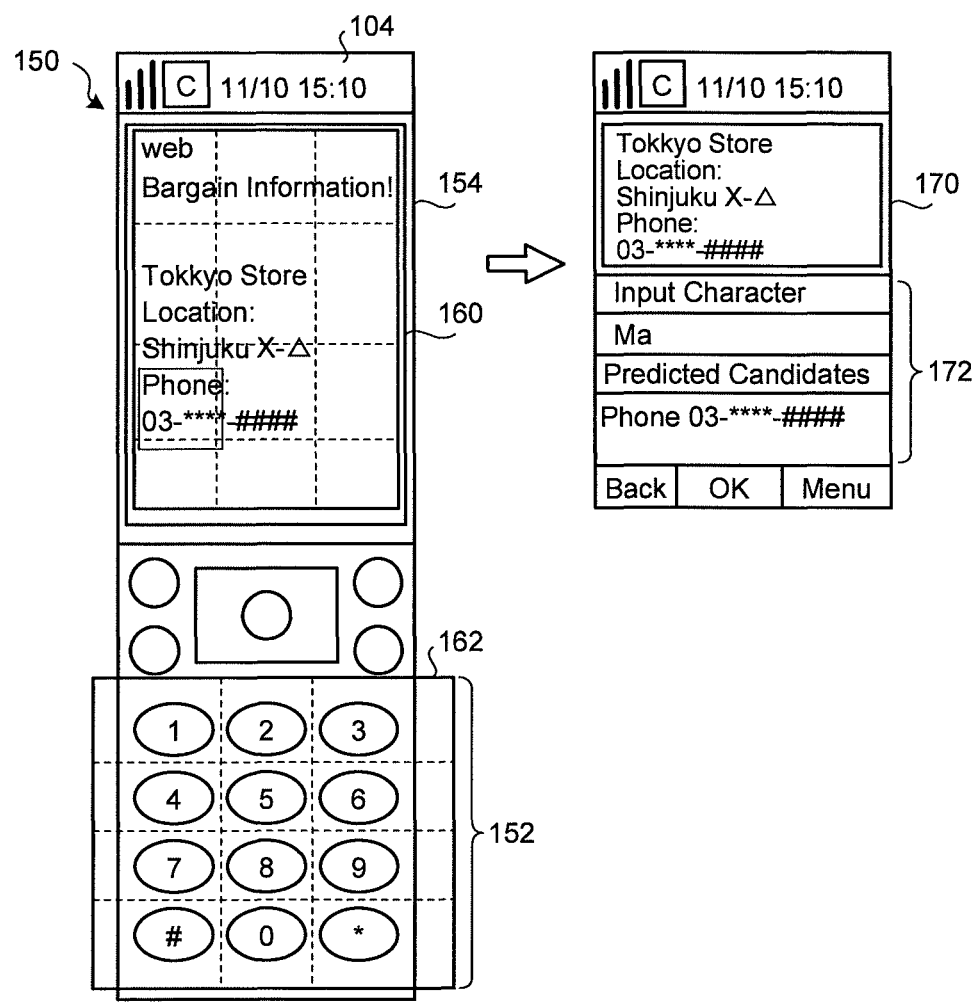
FIG. 21 is an explanatory diagram for explaining operations of the mobile electronic device.

Specifically, as illustrated in the mobile electronic device 150 of FIG. 21, the display area 104 of the display unit 32 are divided into a plurality of divided display areas in such a manner that the display areas correspond to the positions where the keys provided in the operation unit 28 are arranged respectively. That is, a screen 154 is divided into a plurality of divided display areas 160, and a numeric keypad 152 of the operation unit 28 is divided into a plurality of areas 162. The divided display areas 160 and the areas 162 are associated with each other. In this case, when, for example, a key assigned with a number of "7", characters of "Ma", "Mi", "Mu", "Me", "Mo", and the like is pressed, the mobile electronic device 150 causes the input control unit 83 to input character information extracted from the display area corresponding to that key into the input-character display area, as illustrated in a screen 170 of FIG. 21. In this case, character information "Phone: 03-" is extracted. This enables the character information according to the position of the operated key to be used.

The display unit 32 may be a touch panel functioning as the operation unit 28 provided with a plurality of keys. In this case, when an area where any key of the keys provided in the display area 104 of the display unit 32 (the keys displayed in the display area 104) is located is touched while the Web page information is displayed on the display unit 32, character information extracted from the area corresponding to the touched position is input into an input-character display area 172.

The operation unit 28 is provided with the keys assigned with the characters, respectively. When an operation is performed through the operation unit 28 while Web page information is displayed on the display unit 32, the input control unit 83 inputs the character assigned to the operated key into the input-character display area 172.

Specifically, when the key assigned with the number of "7", the characters of "Ma", "Mi", "Mu", "Me", "Mo", and the like is pressed among the keys provided in the operation unit 28 while the Web page information acquired by the acquisition unit 84 is displayed on the display unit 32 as illustrated in FIG. 21, the character "Ma" assigned to the operated key is input into the input-character display area 172 by the input control unit 83, as illustrated in the screen 170 of FIG. 21. The controller 82 also extracts "Phone: 03-" and displays "Phone: 03-****-####" including the extracted character string as a predicted candidate (predicted conversion candidate) in the input-character display area 172 in its selectable state.

Thus, the character information in an arbitrary area can be extracted as input character information from the WEB page.

Next, another embodiment of the mobile electronic device will be explained below with reference to FIG. 22 to FIG. 25. In the mobile electronic device explained below, the outer configuration of the mobile electronic device 1 and the configuration of the controller thereof are basically the same as those of the mobile electronic device 1 illustrated in FIG. 1 to FIG. 3. Detailed explanation of the same portions is omitted.

Conventionally, during display of a screen corresponding to an application in execution thereof, a key operation (e.g., character input) not related to the display of the screen is restricted. Hereinafter, similarly to the above, the application during execution thereof will be explained using the WEB browser as an example.

While the screen (browser screen) of the WEB browser is displayed, an input of the direction and decision key 4 in order to switch between browser screens is received. On the other hand, an input of the numeric keypad 3a in order to input characters is restricted during display of the browser screen. To be precise, when a character input box is selected on the browser screen, the character input can be accepted, however, in any case other than that, even if the numeric keypad 3a is pressed in order to input characters, nothing is reflected on the browser screen.

Therefore, if the user wants to input characters (phone number) displayed on the browser screen, it is necessary to interrupt the WEB browser (as a result, the browser screen is turned off) and activate a character-input application. Because of this, the user needs to memorize the characters displayed on the browser screen, and may therefore input wrong characters. Moreover, because the browser screen is turned off, the browser screen has to be activated once more in order to perform Web search or the like, which causes complicated operation for the user.

In view of the above factors, the mobile electronic device 1 according to the present embodiment performs display control on an application by the display unit (the main display 2M and the sub-display 2S) during execution thereof, as explained later. This enables the user to perform the character input while looking at the screen corresponding to the application.

Figure 22:
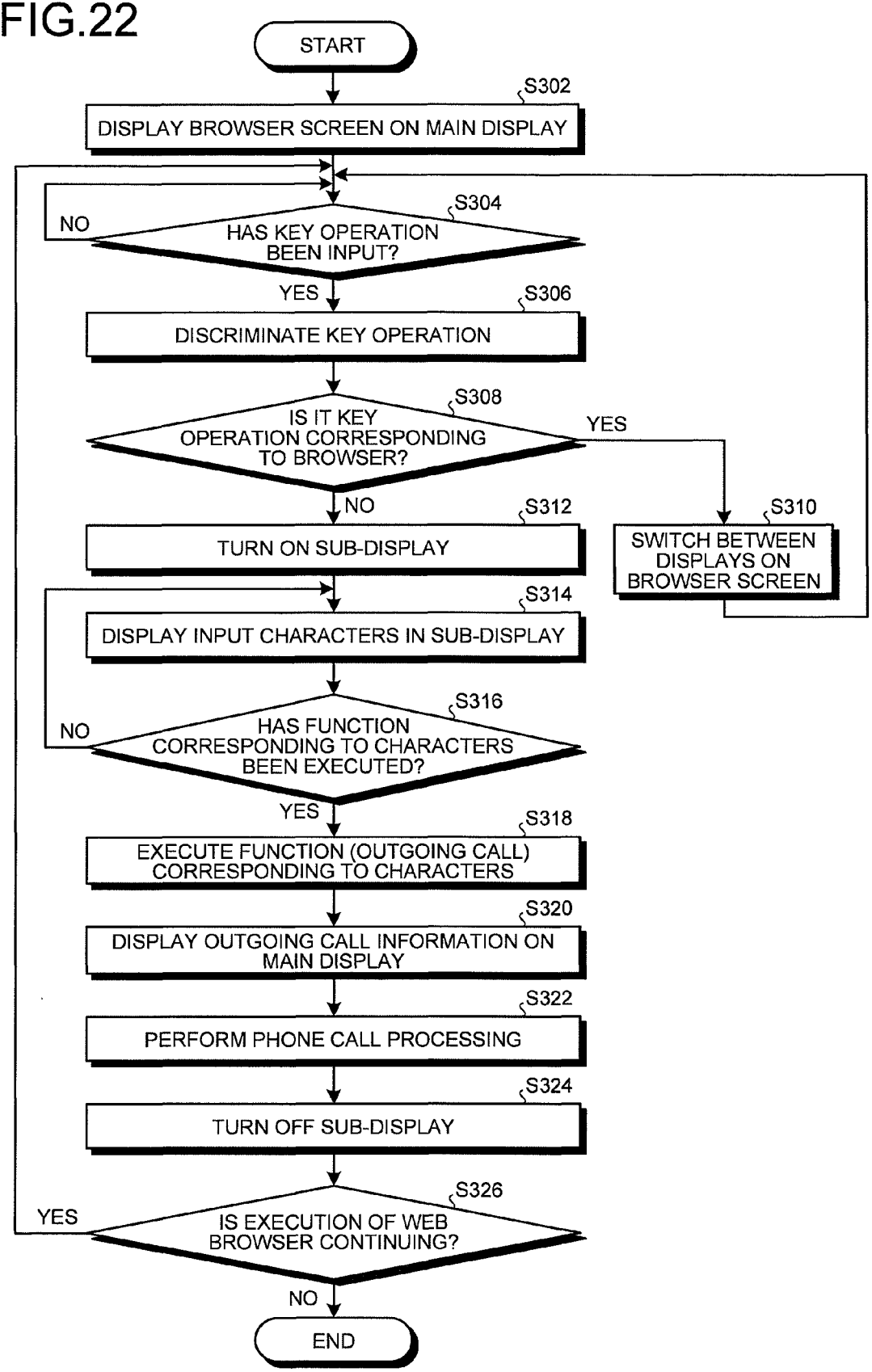
FIG. 22 is a flowchart for explaining display control of a main display and a sub-display.
Figure 23:
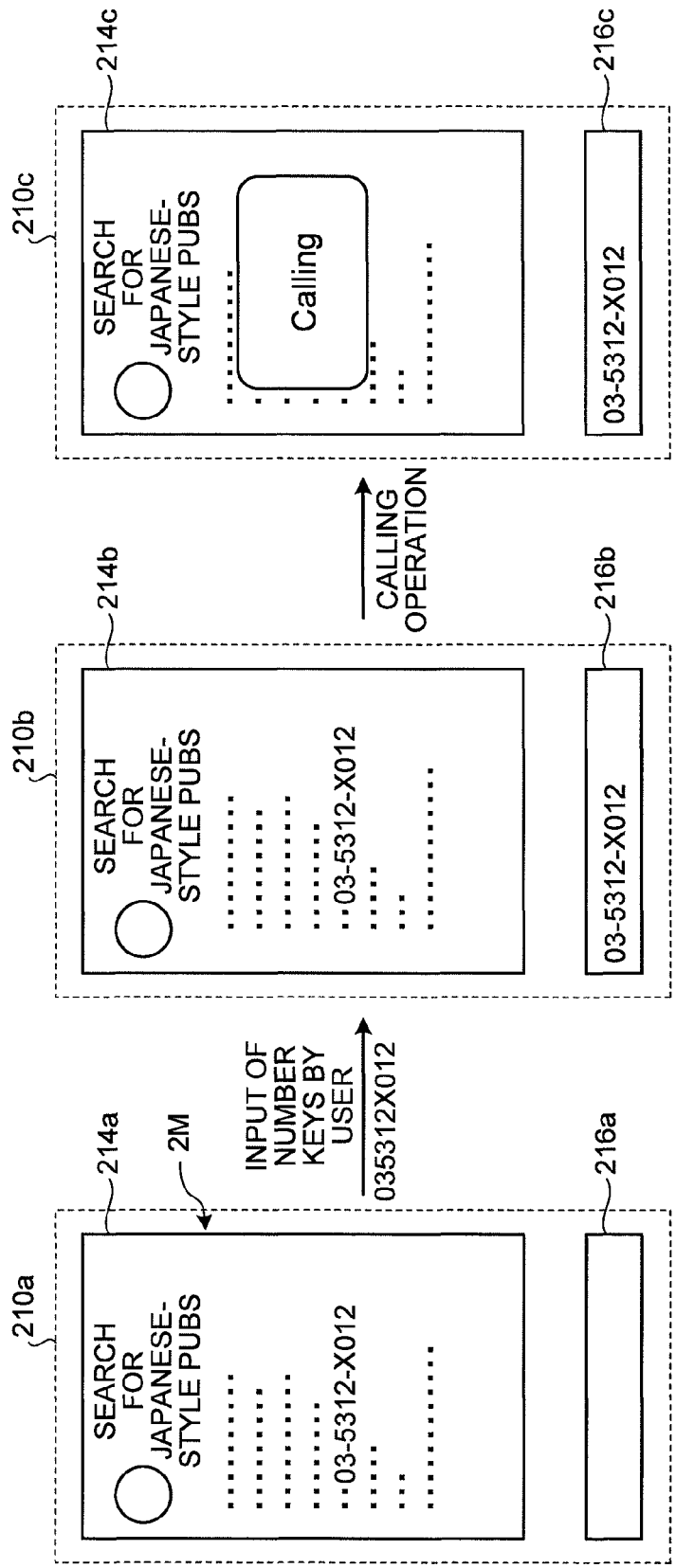
FIG. 23 is a diagram illustrating changes of displays of the main display and the sub-display.

FIG. 22 is a flowchart for explaining display control of the main display and the sub-display. FIG. 23 is a diagram illustrating changes of displays of the main display and the sub-display.

The display control illustrated in FIG. 22 is started, for example, when a predetermined application (in this case, WEB browser) is selected from among the menu items displayed on the main display 2M.

First, the main control unit 22 activates the selected WEB browser, and displays a screen (called "browser screen" for convenience) corresponding to the WEB browser on the main display 2M (Step S302). With this step, for example, a screen 214a (specifically, the browser screen) is assumed to be displayed over the entire area of the main display 2M as illustrated in a display unit 210a of FIG. 23. In the present embodiment, the sub-display 2S is set to be off (turn-off screen 216a) when the screen 214a (browser screen) corresponding to the activated application is displayed on the main display 2M, in terms of suppression of power consumption, and the like.

Subsequently, the main control unit 22 determines whether a key operation has been input while the browser screen is displayed on the main display 2M (Step S304). When it is determined that the key operation has not been input, that is, the key operation has not been detected (No at Step S304), the main control unit 22 again performs the process of Step S304. When the key operation by the user has been detected while the browser screen is displayed on the main display 2M (Yes at Step S304), that is, when the key operation has been detected, the main control unit 22 discriminates the key operation (Step S306). The key operation in the present embodiment is an operation of switching between browser screens using the direction and decision key 4 or an operation of a character input using the numeric keypad 3a.

The main control unit 22 determines whether the key operation discriminated at Step S306 is a key operation for switching between the browser screens using the direction and decision key 4 (Step S308). When it is determined that the key operation is performed to switch between the browser screens using the direction and decision key 4 (Yes at Step S308), the main control unit 22 switches between displays on the main display 2M (Step S310). For example, the main control unit 22 scrolls and displays the browser screen in association with the operation of the direction and decision key 4. Thereafter, when the key operation is performed to switch between displays on the main display 2M, the display of the browser screen on the main display 2M changes. During this period, the sub-display 2S maintains the off state.

Meanwhile, for example, when it is determined that a key operation (e.g., an operation of the numeric keypad 3a) for inputting the phone number is performed in order to make an outgoing call to the phone number displayed on the browser screen illustrated in the display unit 210a of FIG. 23 (No at Step S308), the main control unit 22 activates the sub-display 2S which is kept in the off state until then (in other words, when the browser screen is displayed on the main display 2M, the main control unit 22 controls so as not to display the sub-display 2S before the characters are input) (Step S312). Then, the main control unit 22 displays the characters input at Step S308 (here, it is assumed that a number string forming the phone number is input as the characters) in the activated sub-display 2S (Step S314). The character string (number string) forming the phone number is displayed in the sub-display 2S as illustrated in a screen 216b of a display unit 210b of FIG. 23.

Incidentally, when the number string is displayed in the sub-display 2S, the display state of the main display 2M does not change as illustrated in the display unit 210b of FIG. 23. That is, the input number string is displayed only in the sub-display 2S, but is not displayed on the main display 2M. In other words, the same screen (image) as the screen 214a is displayed on the main display 2M being a screen 214b of the display unit 210b in FIG. 23.

As explained above, in the present embodiment, when the number string is input through the operation unit 28 in the middle of displaying a screen (browser screen) corresponding to an application (WEB browser) during execution thereof on the main display 2M among the main display 2M and the sub-display 2S, the main control unit 22 displays the input number string in the sub-display 2S while maintaining the screen displayed state. Thus, the screen for the character input not related to the operation of the application can be displayed without turn-off of the screen corresponding to the application even during the execution of the application. As a result, the user can perform the character input while, for example, looking at the browser screen, thus improving usability.

Referring back to the flowchart of FIG. 22, explanation of the display control is continued. After the process of Step S314 is performed, the main control unit 22 determines whether a function corresponding to the characters (the character string displayed in the sub-display 2S) has been executed (Step S316). When it is determined that the function corresponding to the character string has not been executed (No at Step S316), the main control unit 22 again performs the process of Step S314. When activation of the function related to the number string (here, activation of an outgoing call operation) is detected (when a system corresponding to the character string is executed) at the time of displaying the number string (phone number) in the sub-display 2S (Yes at Step S316), the main control unit 22 makes an outgoing call to the other party on the phone corresponding to the number string (Step S318). Specifically, when the user presses the call key 3b while the phone number is displayed, the outgoing call is made in the browser-screen displayed state.

The main control unit 22 displays the information for the outgoing call together with the browser screen on the main display 2M when the outgoing call is made to the other party on the phone (Step S320). Specifically, as illustrated in a display unit 210c of FIG. 23, the main control unit 22 displays information indicating "Calling" on a screen 214c. The reason that the information indicating "Calling" is displayed on the main display 2M instead of the sub-display 2S is because the information is displayed on the main display 2M whose display area is larger than that of the sub-display 2S, so that it is easy for the user to recognize that the outgoing call is made. A screen 216c formed with the same image as that of the screen 216b is displayed in the sub-display 2S.

When a user at the other end of the phone responses to the outgoing call operation, the main control unit 22 performs phone call processing with the other party (Step S322). The main control unit 22 maintains the display of the browser screen before the phone number is input even during phone call processing. With this step, the user can inquire about, for example, information displayed on the browser screen while looking at the browser screen at the time of making a phone call.

After the end of the phone call processing, the main control unit 22 turns off the sub-display 2S in the on state (Step S324). In this way, the number string displayed in the sub-display 2S is also deleted. On the other hand, even after the end of the phone call processing, the main control unit 22 maintains the state of displaying the browser screen before the phone number is input to the main display 2M (the state indicated in the display unit 210a of FIG. 23). Thus, the user does not need to activate again the WEB browser after the phone call, and therefore smoothly browses WEB pages using the WEB browser.

Thereafter, the main control unit 22 determines whether the execution of the WEB browser is continuing (Step S326). When it is determined that the execution of the WEB browser is continuing (Yes at Step S326), the main control unit 22 proceeds to Step S304. As a result, the main control unit 22 repeats the processes (from Step S304 to Step S324) during the execution of the activated application (WEB browser) (Yes at Step S326). Meanwhile, when it is determined that the execution of the WEB browser is not continuing (No at Step S326), the main control unit 22 stops the WEB browser and ends the present control.

In the above explanation, the number string (phone number) has been used to explain an example of the characters displayed in the sub-display 2S, however, the characters displayed in the sub-display 2S are not limited thereto. For example, a Kana character may be displayed in the sub-display 2S. In this case, by executing the function corresponding to the character displayed in the sub-display 2S (for example, entry in notepad), useful information on the Web page can be stored.

The mobile electronic device 1 includes the main display 2M and the sub-display 2S in the above embodiment, however, the mobile electronic device 1 includes only the main display 2M in another embodiment explained as follows. Also in the another embodiment, for example, the display control of the main display 2M is performed so that an input of the phone number becomes possible during the display of the browser screen, similarly to the above embodiment.

Figure 24:
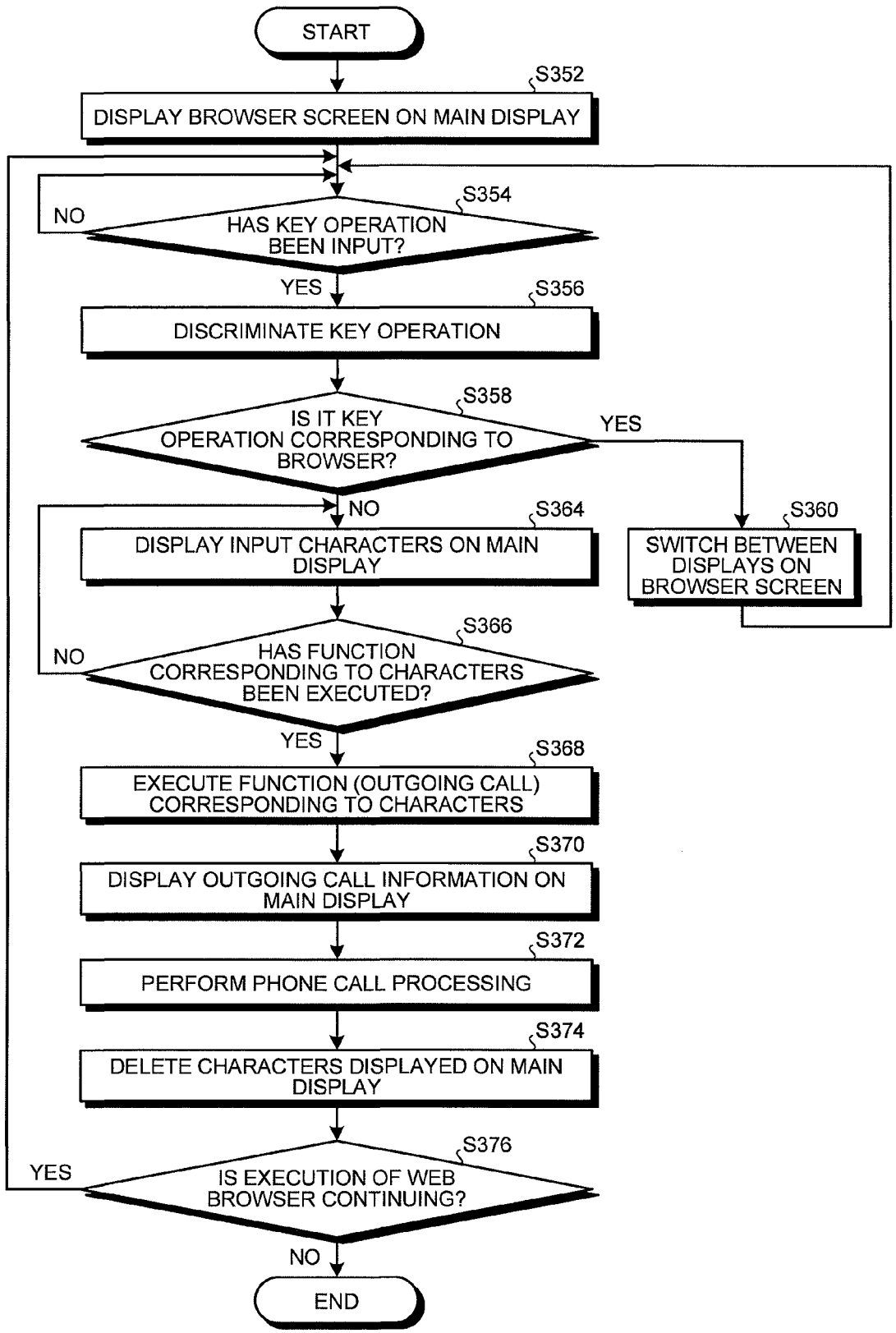
FIG. 24 is a flowchart for explaining display control of the main display according to another embodiment.
Figure 25:
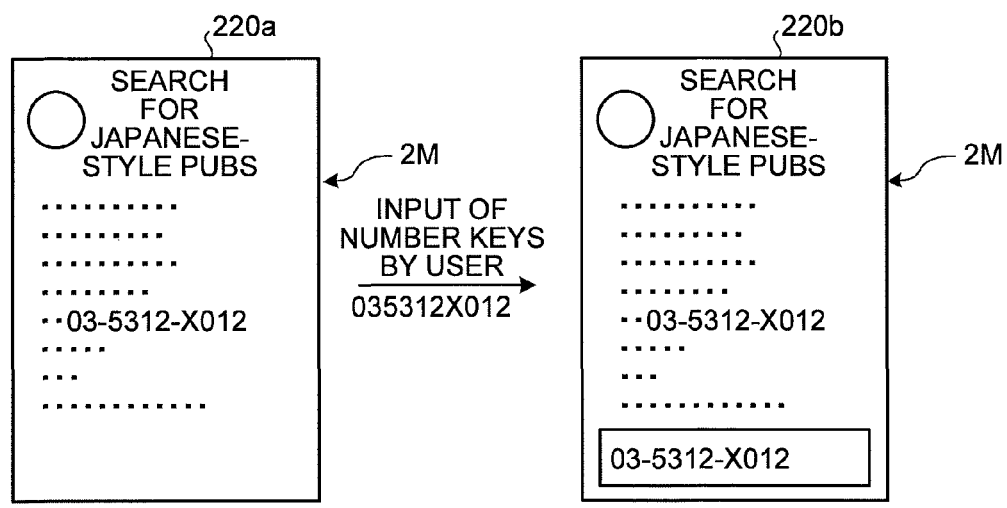
FIG. 25 is a diagram illustrating a change of the display of the main display according to the another embodiment.

FIG. 24 is a flowchart for explaining display control of the main display according to another embodiment. FIG. 25 is a diagram illustrating a change of the display of the main display according to the another embodiment.

The control illustrated in FIG. 24 is also related to the process after the activation of the WEB browser, similarly to FIG. 22. Steps S352 to S360 in FIG. 24 are the same processes as these of Steps S302 to S310 in FIG. 22, and therefore explanation thereof is omitted. At Step S358, when the operated key is not the key operation corresponding to the browser (that is, the key operation for the character input) while the browser screen is displayed on the main display 2M as illustrated in a screen 220a of FIG. 25 (No at Step S358), the main control unit 22 displays the input number string (phone number) on the main display 2M (Step S364).

That is, as illustrated in a screen 220b of FIG. 25, when the number string (phone number) is input through the operation unit 28 while the browser screen is displayed, the main control unit 22 displays the input number string together with the browser screen on the main display 2M while maintaining a display size of the browser screen with respect to the main display 2M. The input number string is displayed on the browser screen in an overlapping manner.

When the call key 3b is pressed while the number string is displayed on the main display 2M (Yes at Step S366), the main control unit 22 performs the outgoing call operation (Step S368), and displays a message of "during outgoing call" on the main display 2M (Step S370). Thereafter, when the phone call processing is performed (Step S372) and the phone call processing is ended, then the number string (phone number) displayed on the main display 2M is deleted (Step S374). This returns the browser screen to a normal display state, so that search or the like using the WEB browser afterward is smoothly performed. The operation when it is determined as No at Step S366 and the operation at Step S376 are the same as the operation when it is determined as No at Step S316 and the operation at Step S326, respectively.

In the embodiment, the input characters are displayed on the browser screen in an overlapping manner, however, the displaying manner is not limited thereto. For example, a partial area of the browser screen may be deleted and the input character may be displayed in the deleted area.

As explained above, in the embodiment illustrated in FIG. 22 and FIG. 23 and the embodiment illustrated in FIG. 24 and FIG. 25, when the character is input through the operation unit 28 while the screen corresponding to the application during execution thereof is displayed, the mobile electronic device 1 displays the input character on the display unit 32 while maintaining the screen displayed state. With this step, the screen for the character input not related to the operation of the application can be displayed without turn-off of the screen corresponding to the application even during the execution of the application. As a result, the user can perform the character input while, for example, looking at the browser screen, thus improving usability.

In the embodiments, the sub-display 2S is provided on the same face as that of the operation unit 28 in the second housing 1CB as illustrated in FIG. 1, however, the configuration is not limited thereto. For example, the sub-display 2S may be provided on the side face of the second housing 1CB. The sub-display 2S does not necessarily have to be provided.

A plurality of embodiments have been explained so far, and it goes without saying that the embodiments can be executed in their mutual combination.

INDUSTRIAL APPLICABILITY

As explained above, the electronic device and the screen display method according to the present invention are useful to be used for a device including a character input function and a function of executing other applications and for a method therefor.

The invention claimed is:

1. An electronic device, comprising:
a display unit for displaying a screen corresponding to an executable application during execution thereof;
an operation unit operable to input a character; and
a control unit,
wherein
when a first input by the operation unit is detected while the screen corresponding to the executable application is displayed on the display unit and a second input by the operation unit is detected before elapse of a predetermined time, the control unit is configured to cause the display unit to display a character corresponding to the first input and a character corresponding to the second input on the display unit, while maintaining the screen corresponding to the executable application to be displayed and changing a display size of the screen.

2. The electronic device according to claim 1, wherein
the display unit includes a first display unit and a second display unit, and
when the first input by the operation unit is detected while the screen corresponding to the executable application is displayed on the first display unit, the control unit is configured to cause the second display unit to display the character corresponding to the first input, while maintaining the screen corresponding to the executable application to be displayed on the first display unit before the first input is detected.

3. The electronic device according to claim 1, wherein
the display unit is configured to display, when a TV broadcast including a plurality of channels is reproduced, a picture of the TV broadcast as the screen corresponding to the executable application,
the operation unit is assigned with a channel input operation for changing between the channels and with a character input operation for inputting characters, and
the control unit further includes an input detector for detecting an input through the operation unit, and
the control unit is further configured to
determine, when the picture of the TV broadcast being the screen corresponding to the executable application is displayed on the display unit, whether an input detected by the input detector is the character input operation or the channel input operation, and
perform the character input, when it is determined that the input is the character input operation, based on the detection of the input detector.

4. The electronic device according to claim 3, wherein
the operation unit includes a plurality of operation keys to which the channels and the characters are assigned, and
the input detector is configured to detect pressing of at least one of the operation keys as the input including the first and second inputs by the operation unit.

5. The electronic device according to claim 3, wherein
the control unit is further configured to
suspend a change of channel when the first input by the operation unit is detected while the picture of the TV broadcast is displayed, and
display, when the second input by the operation unit is further detected before elapse of the predetermined time since the suspension, the character corresponding to the first input and the character corresponding to the second input while maintaining displaying the picture of the TV broadcast.

6. The electronic device according to claim 1, wherein
when the second input by the operation unit is detected before elapse of the predetermined time, the control unit is configured to
reduce the display size of the screen, and
cause the display unit to display, in addition to the screen of the reduced display size, a character input screen including the character corresponding to the first input and the character corresponding to the second input.

* * * * *